United States Patent
Ono

(10) Patent No.: US 10,244,166 B2
(45) Date of Patent: Mar. 26, 2019

(54) IMAGING DEVICE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 206 days.

(21) Appl. No.: 15/368,710

(22) Filed: Dec. 5, 2016

(65) Prior Publication Data
US 2017/0099436 A1    Apr. 6, 2017

Related U.S. Application Data

(63) Continuation of application No. PCT/JP2015/061505, filed on Apr. 14, 2015.

(30) Foreign Application Priority Data

Jun. 27, 2014  (JP) ................................ 2014-132701

(51) Int. Cl.
*G02B 7/02*       (2006.01)
*G02B 23/24*    (2006.01)
(Continued)

(52) U.S. Cl.
CPC ....... *H04N 5/23238* (2013.01); *G02B 3/0006* (2013.01); *G02B 13/00* (2013.01);
(Continued)

(58) Field of Classification Search
CPC ............... H04N 5/2259; H04N 5/2254; H04N 5/23219; H04N 5/23245; H04N 5/23296;
(Continued)

(56) References Cited

U.S. PATENT DOCUMENTS 6,404,455 B1    6/2002  Ito et al.
6,734,911 B1 *  5/2004  Lyons ..................... G01S 3/781
                                                              348/169
(Continued)

FOREIGN PATENT DOCUMENTS

JP    S59-127028 A    7/1984
JP    H10-048701 A    2/1998
(Continued)

OTHER PUBLICATIONS

An Office Action; "Notification of Reasons for Refusal" issued by the Japanese Patent Office dated Apr. 27, 2017, which corresponds to Japanese Patent Application No. 2014-132701 and is related to U.S. Appl. No. 15/368,710; with English language translation.
(Continued)

*Primary Examiner* — Dawayne Pinkney
(74) *Attorney, Agent, or Firm* — Studebaker & Brackett PC

(57) ABSTRACT

In a preferred aspect of the invention, an imaging optical system having a wide-angle optical system and a telephoto optical system which are provided in different regions is provided. A directional sensor that has a plurality of pixels including photoelectric conversion elements which are two-dimensionally arranged pupil-divides light beams which are incident through the wide-angle optical system and the telephoto optical system, and selectively receives the light beams. An image acquisition unit acquires a wide-angle image received from the directional sensor through the wide-angle optical system and a telephoto image received from the directional sensor through the telephoto optical system. The directions of the imaging optical axes of the wide-angle optical system and the telephoto optical system of the imaging optical system are different from each other.

21 Claims, 19 Drawing Sheets

(51) Int. Cl.
| | |
|---|---|
| *G02B 17/00* | (2006.01) |
| *H04N 5/232* | (2006.01) |
| *G02B 13/00* | (2006.01) |
| *G02B 17/08* | (2006.01) |
| *G03B 5/02* | (2006.01) |
| *G03B 5/04* | (2006.01) |
| *G03B 15/00* | (2006.01) |
| *G03B 19/07* | (2006.01) |
| *G03B 37/00* | (2006.01) |
| *H04N 5/225* | (2006.01) |
| *G02B 3/00* | (2006.01) |

(52) U.S. Cl.
CPC ........... *G02B 17/004* (2013.01); *G02B 17/08* (2013.01); *G03B 5/02* (2013.01); *G03B 5/04* (2013.01); *G03B 15/00* (2013.01); *G03B 19/07* (2013.01); *G03B 37/00* (2013.01); *H04N 5/225* (2013.01); *H04N 5/23212* (2013.01); *H04N 5/23232* (2013.01); *H04N 5/23296* (2013.01)

(58) Field of Classification Search
CPC ............... H04N 9/045; H04N 5/23212; H04N 5/23238; H04N 5/225; G02B 17/086; G02B 17/08; G02B 7/021; G02B 13/00; G02B 21/361; G03B 17/00; G03B 13/19608; G03B 13/1963; G03B 15/16; G03B 17/561; G03B 41/00; G03F 7/70225; G03F 7/70233; G11B 7/0932
USPC ................. 359/813, 726, 728, 811, 362–366
See application file for complete search history.

(56) References Cited

U.S. PATENT DOCUMENTS

| | | | |
|---|---|---|---|
| 8,605,197 | B2 | 12/2013 | Ono |
| 2004/0264013 | A1 | 12/2004 | Matsuki et al. |
| 2006/0012681 | A1 | 1/2006 | Fujii |
| 2006/0266835 | A1 | 11/2006 | Tanida |
| 2008/0117326 | A1 | 5/2008 | Nishio |
| 2009/0135502 | A1* | 5/2009 | Border ............... G02B 17/0896 359/721 |
| 2010/0265331 | A1 | 10/2010 | Tanaka |
| 2011/0164108 | A1 | 7/2011 | Bates et al. |
| 2013/0265507 | A1 | 10/2013 | Ford et al. |
| 2014/0168498 | A1* | 6/2014 | Ono ....................... G03B 11/00 348/335 |

FOREIGN PATENT DOCUMENTS

| | | | |
|---|---|---|---|
| JP | H11-069342 A | 3/1999 | |
| JP | 2000-341574 A | 12/2000 | |
| JP | 2003-510666 A | 3/2003 | |
| JP | 2003-116029 A | 4/2003 | |
| JP | 2006-033224 A | 2/2006 | |
| JP | 2008-129454 A | 6/2008 | |
| JP | 2009-128527 A | 6/2009 | |
| JP | 2010-141671 A | 6/2010 | |
| JP | 2011-505022 A | 2/2011 | |
| JP | 2012-247645 A | 12/2012 | |
| JP | 2012-253670 A | 12/2012 | |
| JP | WO 2013027488 A1 * | 2/2013 | ............. G03B 11/00 |
| JP | 2013-205781 A | 10/2013 | |
| WO | 03/042743 A1 | 5/2003 | |
| WO | 2012/043211 A1 | 4/2012 | |

OTHER PUBLICATIONS

International Search Report issued in PCT/JP2015/061505; dated Jun. 30, 2015.
Written Opinion issued in PCT/JP2015/061505; dated Jun. 30, 2015.
Extended European Search Report (EESR) dated Mar. 16, 2017 from corresponding EP Appl No. 15812011.3, 4 pp.
Ford; "Photonic Systems Integration Laboratory"; the Internet <URL: http://psilab.ucsd.edu/research/Telescopic Contact Lens/main. html>; Jacobs School of Engineering; University of California at San Diego, U.S.A.

* cited by examiner

IMAGING DEVICE

CROSS-REFERENCE TO RELATED APPLICATIONS

This application is a Continuation of PCT International Application No. PCT/JP2015/061505 filed on Apr. 14, 2015, which claims priority under 35 U.S.C. § 119(a) to Japanese Patent Application No. 2014-132701 filed on Jun. 27, 2014. Each of the above applications is hereby expressly incorporated by reference, in their entirety, into the present application.

BACKGROUND OF THE INVENTION

1. Field of the Invention

The present invention relates to an imaging device, and more particularly, to an imaging device that can acquire a wide-angle image and a telephoto image at the same time.

2. Description of the Related Art

In recent years, an imaging device has been known which can acquire a wide-angle image and a telephoto image at the same time. For example, JP1998-48701A (JP-H10-48701A) discloses an imaging device comprising a wide-angle lens, a telephoto lens, a first imaging element that captures a wide-angle image through the wide-angle lens, and a second imaging element that captures a telephoto image through the telephoto lens. JP2003-116029A discloses an imaging device in which an imaging surface of an imaging element is divided into two regions, a wide-angle image is captured by one region of the imaging surface through a wide-angle lens, and a telephoto image is captured by the other region of the imaging surface through a telephoto lens.

In the imaging device disclosed in JP1998-48701A (JP-H10-48701A), since a wide-angle image and a telephoto image are captured by different imaging elements, two imaging elements are required. Therefore, it is difficult to reduce the size and cost of the imaging device. In the imaging device disclosed in JP2003-116029A, the imaging surface of the imaging element is divided into two regions and a wide-angle image and a telephoto image are captured by the two regions. Therefore, it is necessary to increase the size of the imaging element and images are substantially captured by two imaging elements. As a result, it is difficult to reduce the size and cost of the imaging device disclosed in JP2003-116029A.

JP2013-205781A discloses an imaging device including an imaging lens that has a plurality of regions (for example, a far focal distance region and a near focal distance region) with different focal lengths or focal distances and an imaging element (directional sensor) that pupil-divides light beams which have passed through the far focal distance region and the near focal distance region, selectively receives the light beams, and captures images. The imaging lens includes a central optical system (wide-angle lens) and an annular optical system (telephoto lens) provided in the periphery of the central optical system which are disposed on the same imaging optical axis (see paragraph 0038 in JP2013-205781A). The imaging device disclosed in JP2013-205781A can pupil-divide light beams which have passed through different regions of the imaging lens and can simultaneously capture a plurality of images (a wide-angle image and a telephoto image) corresponding to the pupil-divided light beams using one imaging element. Therefore, it is possible to reduce the size and cost of the imaging device.

SUMMARY OF THE INVENTION

However, in the imaging device disclosed in JP2013-205781A, since the central optical system and the annular optical system are disposed on the same imaging optical axis, the center of the wide-angle image is aligned with the center of the telephoto image and it is difficult to change the centers of the two images. Therefore, unlike the imaging devices disclosed in JP1998-48701A (JP-H10-48701A) and JP2003-116029A, it is difficult to capture the wide-angle image and the telephoto image in different imaging regions at the same time. That is, since the imaging optical axis of the central optical system is aligned with the imaging optical axis of the annular optical system, only a telephoto image in a single region at the center of the imaging region is obtained. For example, in a case in which the imaging device is used as an in-vehicle camera, a user wants to obtain a telephoto image of a road sign or a traffic signal located at a position that is shifted to the upper left side in a view in front of the vehicle in the traveling direction (a central portion of the imaging region) or a telephoto image of an oncoming vehicle on the opposite line located at a position that is shifted to the right side in the view in front of the vehicle in the traveling direction.

The invention has been made in view of the above-mentioned problems and an object of the invention is to provide an imaging device that is not provided with a plurality of imaging elements and can capture a wide-angle image and a telephoto image in different imaging regions at the same time.

In order to achieve the object of the invention, according to an aspect of the invention, there is provided an imaging device comprising: an imaging optical system including a wide-angle optical system and a telephoto optical system which are provided in different regions; a directional sensor that includes a plurality of pixels including photoelectric conversion elements which are two-dimensionally arranged, pupil-divides light beams which are incident through the wide-angle optical system and the telephoto optical system, and selectively receives the light beams; and an image acquisition unit that acquires a wide-angle image received from the directional sensor through the wide-angle optical system and a telephoto image received from the directional sensor through the telephoto optical system. Directions of imaging optical axes of the wide-angle optical system and the telephoto optical system of the imaging optical system are different from each other.

According to the invention, a wide-angle image and a telephoto image in different imaging regions can be acquired at the same time by the wide-angle optical system and the telephoto optical system of which the directions of the imaging optical axes are different from each other.

According to another aspect of the invention, in the imaging device, the telephoto optical system may include a plurality of telephoto optical systems which are provided in different regions. The directional sensor may pupil-divide light beams which are incident through the plurality of telephoto optical systems and selectively receive the light beams. Directions of imaging optical axes of the plurality of telephoto optical systems may be different from each other. According to this structure, it is possible to acquire telephoto images in a plurality of different imaging regions at the same time.

According to still another aspect of the invention, in the imaging device, the directions of the imaging optical axes of the plurality of telephoto optical systems may be different from a direction of an imaging optical axis of the wide-angle optical system in at least one of a horizontal direction or a vertical direction. According to this structure, telephoto images in a plurality of imaging regions in a direction that is different from the direction of the imaging optical axis of the wide-angle optical system are obtained. As a result, it is possible to capture large images of a plurality of objects of interest.

According to yet another aspect of the invention, in the imaging device, the plurality of telephoto optical systems may have the same focal length and have angles of view which partially overlap each other. A plurality of telephoto images in which imaging regions (angles of view) partially overlap each other are obtained.

According to still yet another aspect of the invention, the imaging device may further comprise an image processing unit that generates an image signal indicating a panorama image obtained by combining a plurality of telephoto images, which have been received through the plurality of telephoto optical systems and acquired by the image acquisition unit, on the basis of an image signal indicating the plurality of telephoto images. It is possible to capture an image of an object that is too large to be put in the field of view with only one telephoto image. In addition, it is possible to effectively capture an image of an object that is long in one direction.

According to yet still another aspect of the invention, in the imaging device, preferably, one of the wide-angle optical system and the telephoto optical system of the imaging optical system is a circular central optical system and the other optical system is an annular optical system that is provided concentrically with the central optical system. In the imaging optical system, the wide-angle optical system and the telephoto optical system can be disposed in different regions.

According to still yet another aspect of the invention, in the imaging device, the annular optical system may be the telephoto optical system of the imaging optical system and include a reflection optical system that reflects the light beam two or more times. According to this structure, it is possible to reduce the length of the annular optical system in the optical axis direction and thus to reduce the size of the imaging device.

According to yet still another aspect of the invention, in the imaging device, the reflection optical system of the telephoto optical system may include at least a main reflection optical system that reflects the light beam and a sub-reflection optical system that further reflects the light beam reflected by the main reflection optical system. The main reflection optical system may be provided so as to be inclined by an angle corresponding to a difference between an imaging direction of the main reflection optical system and an imaging direction of the wide-angle optical system with respect to a light receiving surface of the directional sensor. The sub-reflection optical system may be provided so as to be inclined by an angle that is half of the angle with respect to the light receiving surface of the directional sensor. According to this structure, it is possible to incline the imaging optical axis of the annular optical system by an arbitrary angle in an arbitrary direction, without moving an imaging plane of a telephoto image formed on the directional sensor.

According to still yet another aspect of the invention, preferably, the imaging device further includes a focus adjustment unit that adjusts a focus of the telephoto optical system. According to this structure, it is possible to adjust the focus of the telephoto optical system.

According to yet still another aspect of the invention, in the imaging device, the directional sensor may include a microlens array that functions as a pupil division unit or a light shielding mask. According to this structure, it is possible to acquire a wide-angle image corresponding to the central optical system and a telephoto image corresponding to the annular optical system at the same time.

The imaging device according to the invention is not provided with a plurality of imaging elements and can capture a wide-angle image and a telephoto image in different imaging regions at the same time.

DESCRIPTION OF THE PREFERRED EMBODIMENTS

Hereinafter, an embodiment of an imaging device according to the invention will be described with reference to the accompanying drawings.

<Outward Appearance of Imaging Device>

Figure 1:
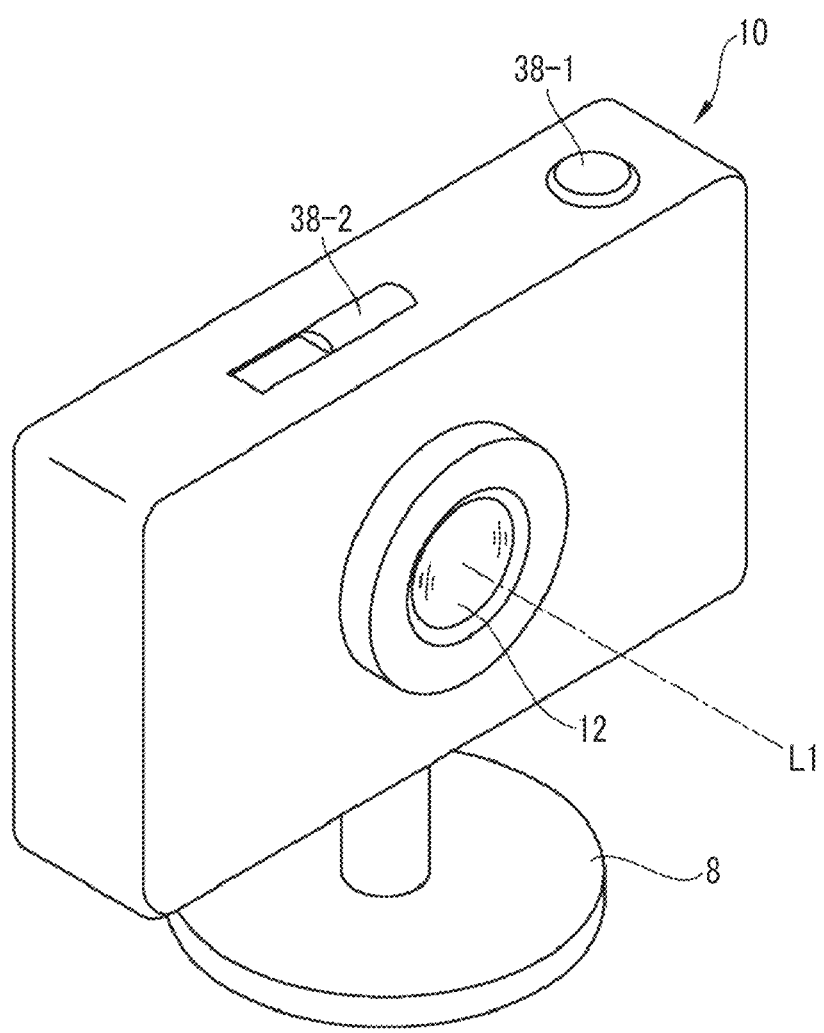
FIG. 1 is a perspective view illustrating the outward appearance of an imaging device according to the invention.

FIG. 1 is a perspective view illustrating the outward appearance of the imaging device according to the invention. As illustrated in FIG. 1, an imaging device 10 is an in-vehicle camera that is provided in a vehicle. An imaging optical system 12 is provided on a front surface of the imaging device 10. For example, a recording switch 38-1 and a power switch 38-2 are provided on an upper surface of the imaging device 10. An in-vehicle fixing stage 8 is attached to the bottom of the imaging device 10. In FIG. 1, reference numeral L1 indicates an imaging optical axis of the imaging optical system 12.

Figure 2:
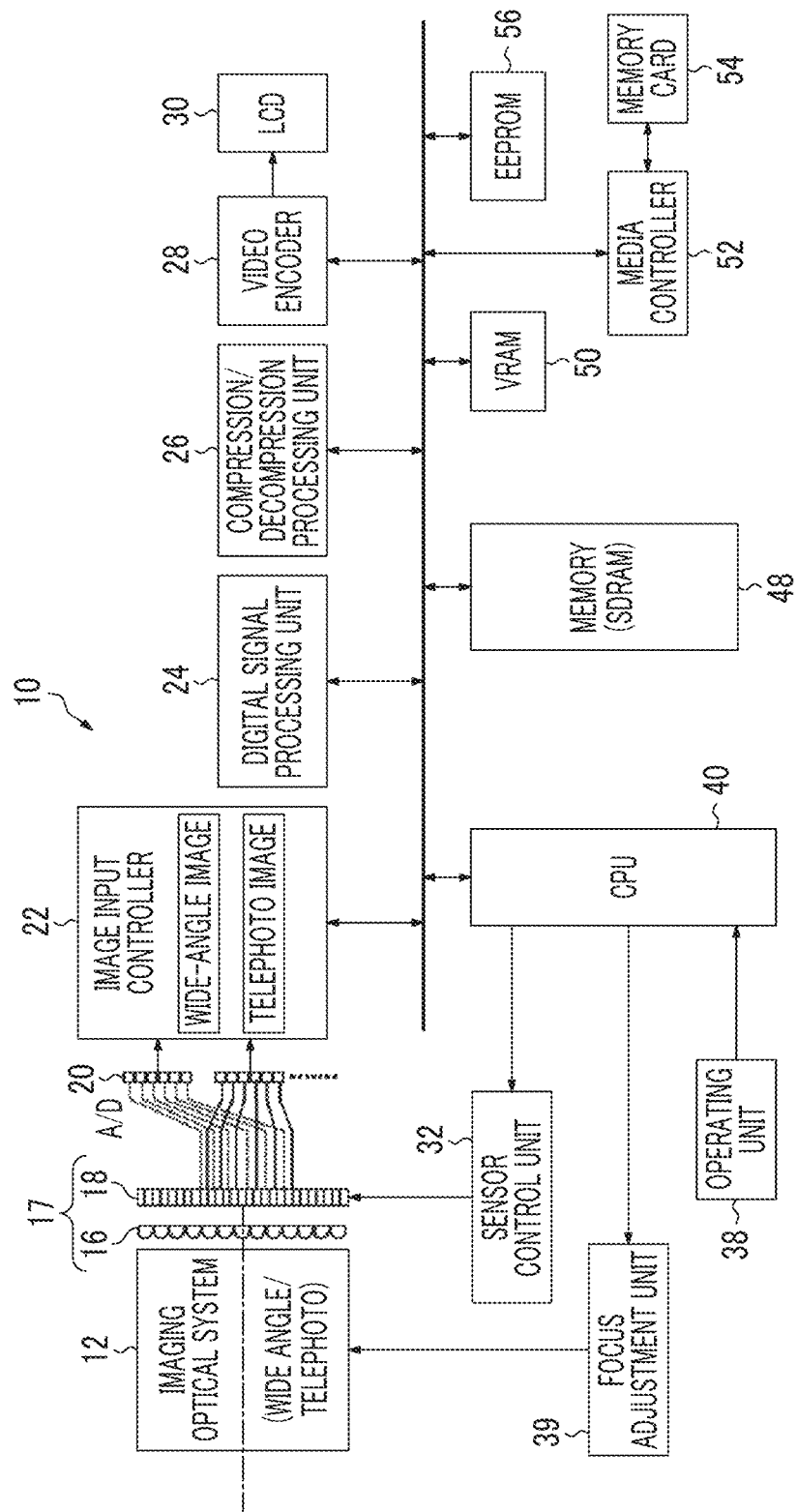
FIG. 2 is a block diagram illustrating an embodiment of the internal structure of the imaging device.

FIG. 2 is a block diagram illustrating an embodiment of the internal structure of the imaging device 10.

The imaging device 10 records a captured image on a memory card 54 and is mainly characterized by the imaging optical system 12 and a directional sensor 17. The directional sensor 17 includes a microlens array 16 and an imaging element (also referred to as an image sensor) 18.

[Imaging Optical System According to First Embodiment]

Figure 3:
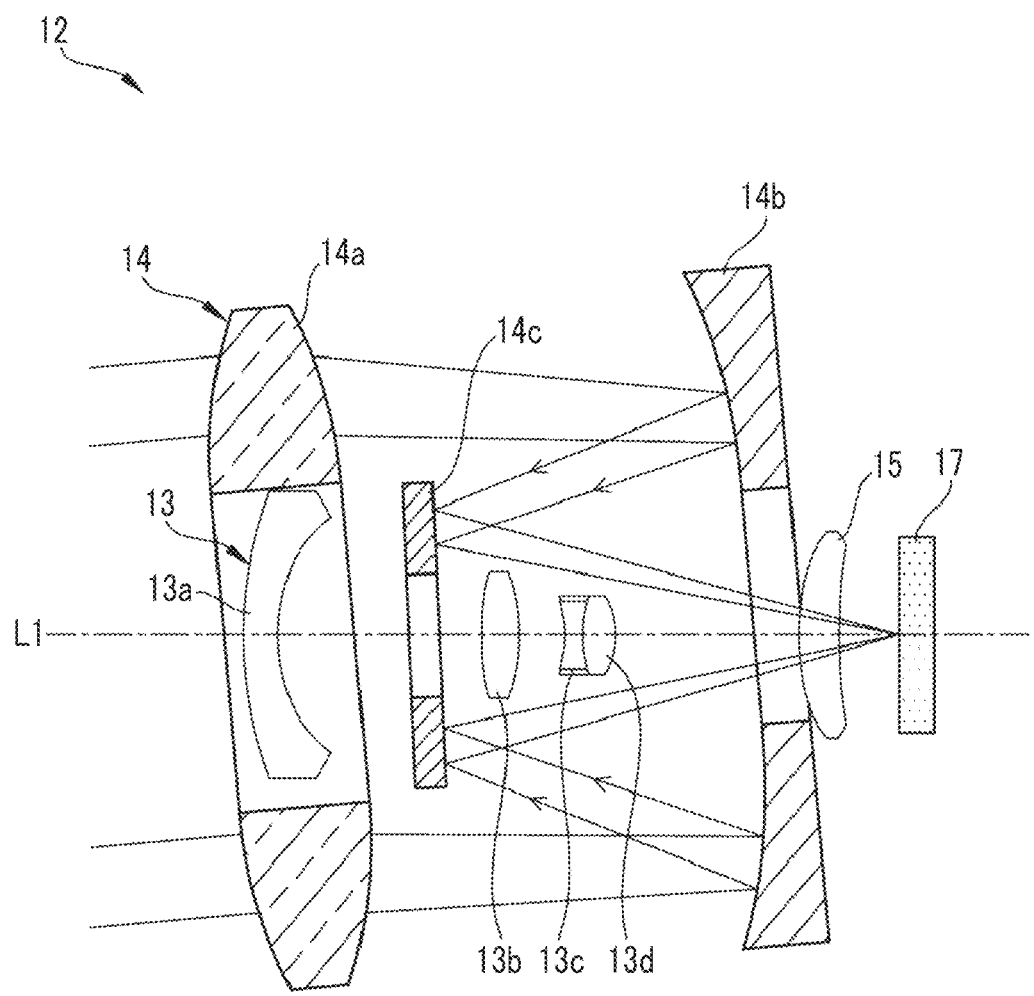
FIG. 3 is a cross-sectional view illustrating a first embodiment of an imaging optical system applied to the imaging device.

FIG. 3 is a cross-sectional view illustrating a first embodiment of the imaging optical system applied to the imaging device 10.

As illustrated in FIG. 3, the imaging optical system 12 includes a wide-angle optical system and a telephoto optical system which are provided in different regions. The imaging optical system 12 includes a circular central optical system (corresponding to the wide-angle optical system according to the invention) 13 and an annular optical system (corresponding to the telephoto optical system according to the invention) 14 which is provided concentrically with the central optical system 13.

The central optical system 13 is a wide-angle optical system (wide-angle lens) including a first lens 13a, a second lens 13b, a third lens 13c, a fourth lens 13d, and a common lens 15 and forms a wide-angle image on the microlens array 16. In this embodiment, an imaging optical axis of the central optical system 13 is the imaging optical axis L1.

[Annular Optical System]

Figure 4:
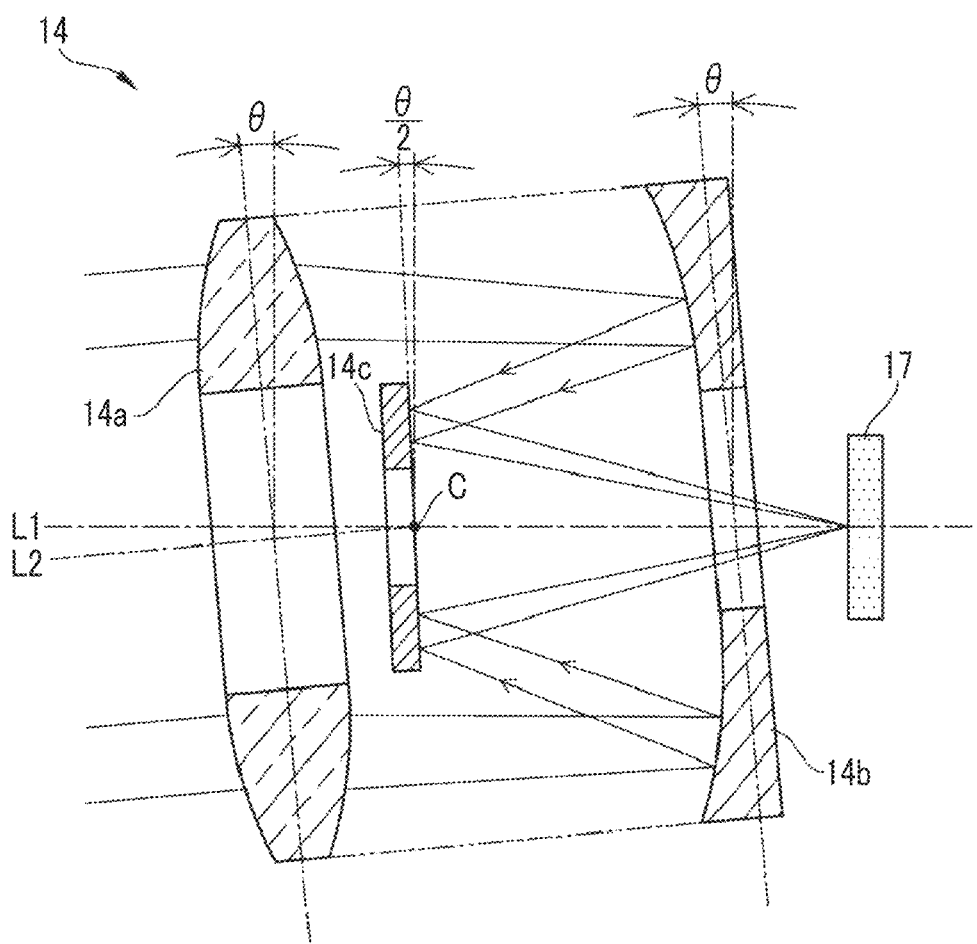
FIG. 4 is a cross-sectional view illustrating an annular optical system according to the first embodiment.
Figure 5:
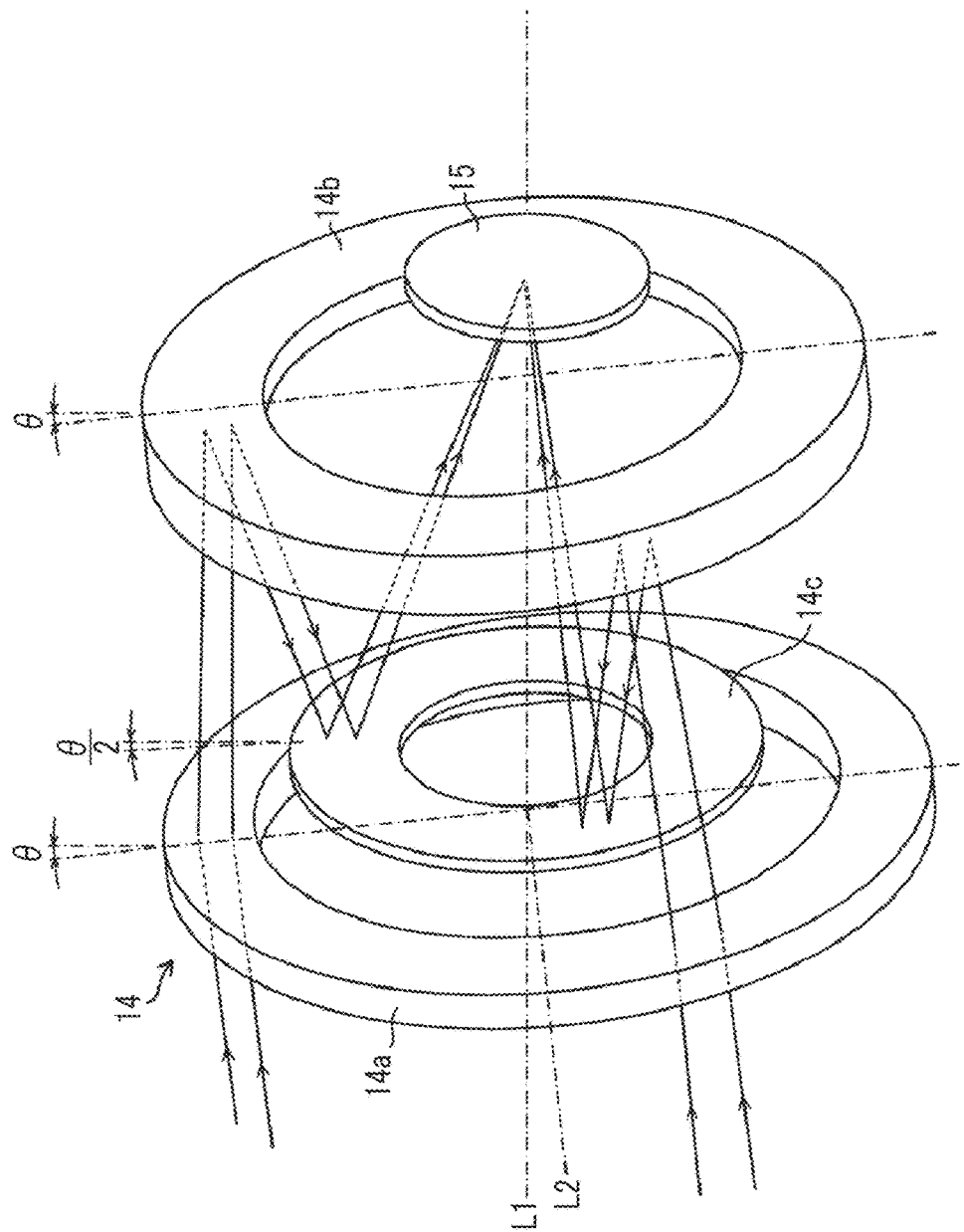
FIG. 5 is a perspective view illustrating the outward appearance of the annular optical system according to the first embodiment.
Figure 6:
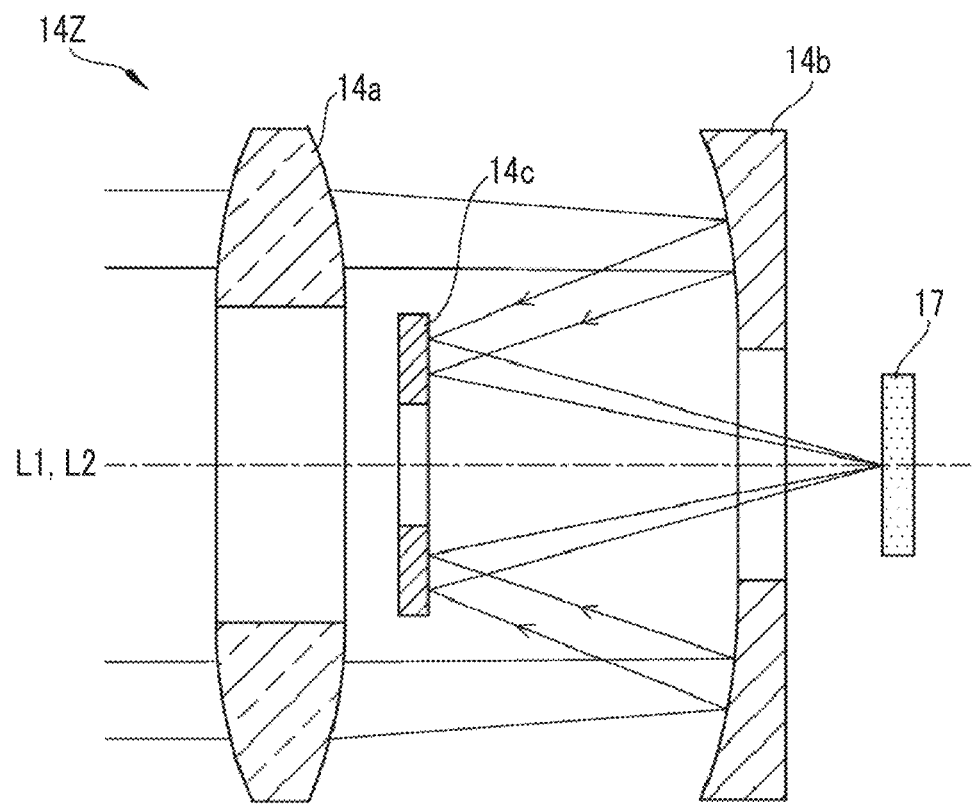
FIG. 6 is a cross-sectional view illustrating an annular optical system according to a comparative example.

FIG. 4 is a cross-sectional view illustrating the annular optical system 14 divided by a plane along the imaging optical axis L1 and FIG. 5 is a perspective view illustrating the outward appearance of the annular optical system. FIG. 6 is a cross-sectional view illustrating an annular optical system 14Z according to a comparative example and FIG. 7 is a perspective view illustrating the outward appearance of the annular optical system 14Z according to the comparative example.

As illustrated in FIGS. 4 and 5, the annular optical system 14 is a telephoto optical system of the imaging optical system 12 and forms a telephoto image on the microlens array 16. The annular optical system 14 includes a reflection optical system that reflects a light beam two times and the common lens 15 (not illustrated in FIGS. 4 and 6). The reflection optical system includes a lens 14a, a first reflecting mirror 14b, and a second reflecting mirror 14c. A light beam which is incident through the lens 14a is reflected two times by the first reflecting mirror 14b and the second reflecting mirror 14c and passes through the common lens 15. Since a light beam is reflected by the first reflecting mirror 14b and the second reflecting mirror 14c, the length of the telephoto optical system (telephoto lens) with a large focal length in the optical axis direction is reduced. Here, the lens 14a and the first reflecting mirror 14b correspond to a main reflection optical system according to the invention and the second reflecting mirror 14c corresponds to a sub-reflection optical system according to the invention.

Figure 7:
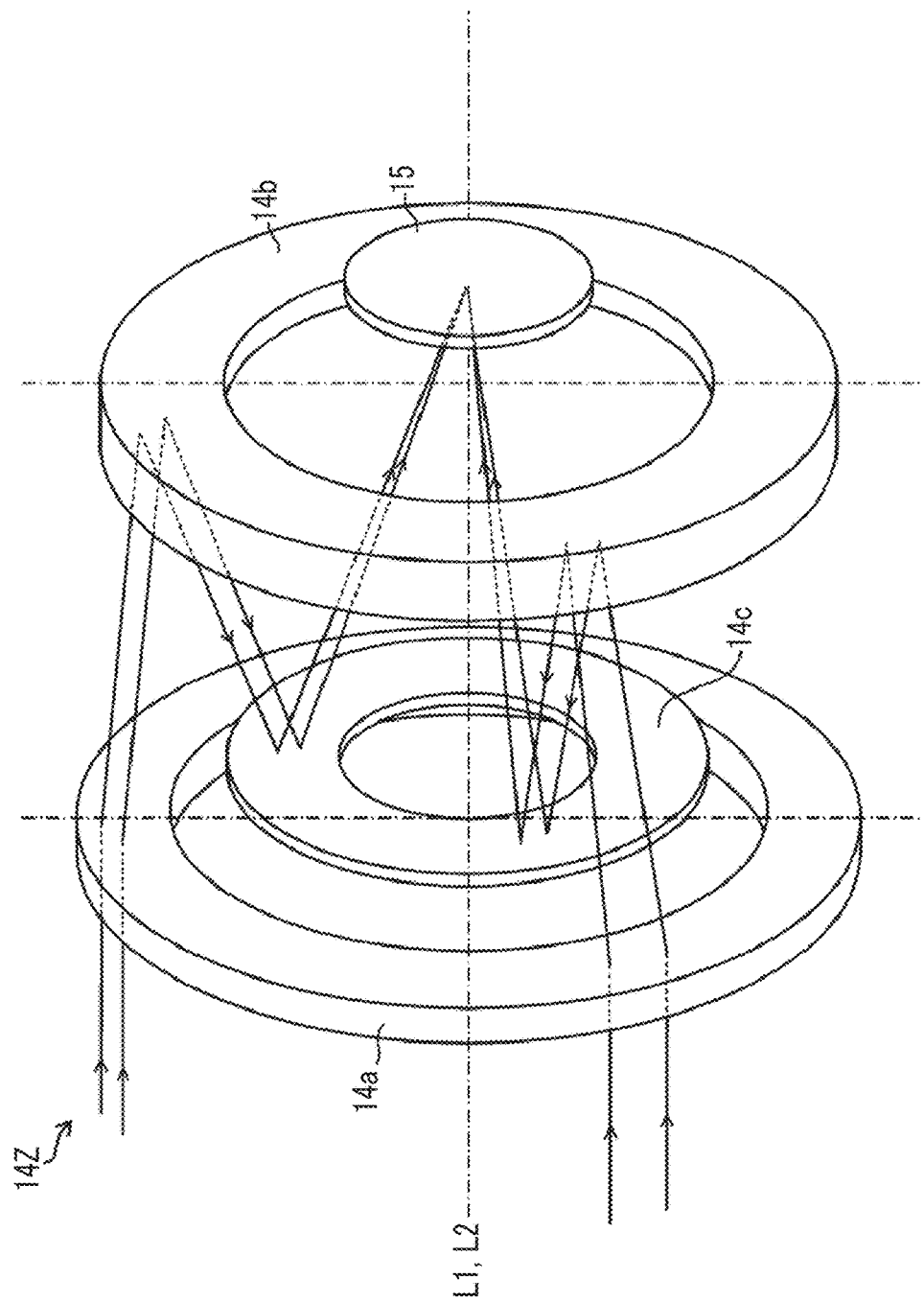
FIG. 7 is a perspective view illustrating the outward appearance of the annular optical system according to the comparative example.

The direction of the imaging optical axis L2 of the annular optical system 14 is not aligned with the direction of the imaging optical axis L1 of the central optical system 13 as in the annular optical system 14Z according to the comparative example illustrated in FIGS. 6 and 7 and is different from the direction of the imaging optical axis L. The imaging optical axis L2 is inclined by an angle θ from the imaging direction (that is, the direction of the imaging optical axis L1) of the central optical system 13 with respect to a light receiving surface of the directional sensor 17.

Specifically, in the annular optical system 14Z according to the comparative example illustrated in FIGS. 6 and 7, since the direction of the imaging optical axis L1 is aligned with the direction of the imaging optical axis L2, the lens 14a, the first reflecting mirror 14b, and the second reflecting mirror 14c are provided so as to be parallel to the light receiving surface of the directional sensor 17.

In contrast, in the annular optical system 14 illustrated in FIGS. 4 and 5, the lens 14a and the first reflecting mirror 14b forming the main reflection optical system is inclined by the angle θ, which is the difference between the imaging direction of the annular optical system 14 and the imaging direction (the direction of the imaging optical axis L1) of the central optical system 13, with respect to the light receiving surface of the directional sensor 17. Here, the lens 14a and the first reflecting mirror 14b are inclined as a group by the angle θ. At that time, it is preferable that the center of rotation of the lens 14a and the first reflecting mirror 14b is in the vicinity of an intersection point C (not illustrated in FIG. 5) between the imaging optical axis L1 and the second reflecting mirror 14c.

The second reflecting mirror 14c forming the sub-reflection optical system is provided so as to be inclined by an angle (=θ/2) that is half of the angle θ in the same direction as the main reflection optical system. At that time, it is preferable that the center of rotation of the second reflecting mirror 14c is the same as the center of rotation (in the vicinity of the intersection point C) of the lens 14a and the first reflecting mirror 14b. The annular optical system 14 is formed by the main reflection optical system and the sub-reflection optical system. Therefore, when the main reflection optical system is inclined by the angle θ and the sub-reflection optical system is inclined by θ/2, the center of the field of view of the annular optical system 14 is moved, but the an imaging plane of the telephoto image formed on the microlens array 16 is not moved. In this way, it is possible to incline the imaging optical axis L2 by an arbitrary angle θ in an arbitrary direction, without moving the imaging plane of the telephoto image. As a result, a telephoto image with an imaging region that is different from an imaging region of a wide-angle image is obtained.

[Directional Sensor]

Figure 8:
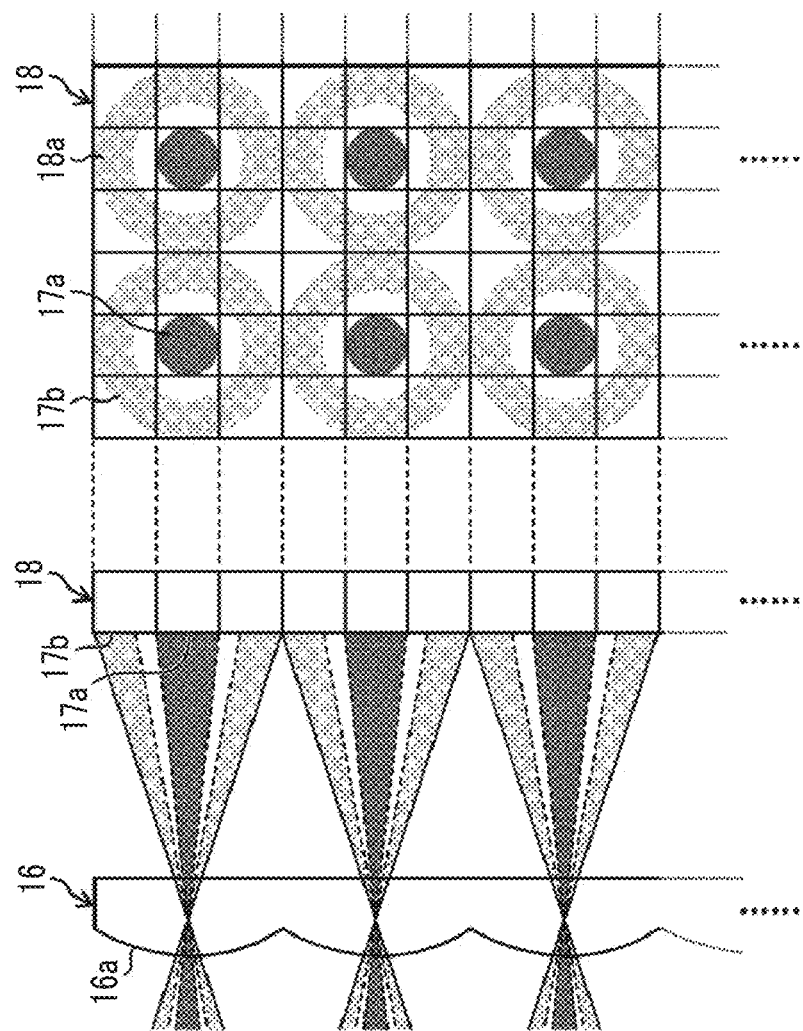
FIG. 8 is an enlarged view illustrating main portions of a microlens array and an imaging element forming a directional sensor.

FIG. 8 is an enlarged view illustrating main portions of the microlens array 16 and the imaging element 18 forming the directional sensor 17.

The microlens array 16 functions as a pupil division unit. The microlens array 16 has a structure in which a plurality of microlenses (pupil lenses) 16a are two-dimensionally arranged and the length of each microlens 16a in the horizontal direction and the vertical direction corresponds to the length of three light receiving cells 18a which are photoelectric conversion elements in the imaging element 18. That is, each microlens 16a of the microlens array 16 is formed so as to correspond to the position of every three light receiving cells in the horizontal direction and the vertical direction.

Each microlens 16*a* of the microlens array 16 forms a central pupil image 17*a* and an annular pupil image 17*b* which correspond to the central optical system 13 and the annular optical system 14 of the imaging optical system 12 on the light receiving cells 18*a* in a corresponding light receiving region of the imaging element 18.

According to the microlens array 16 and the imaging element 18 illustrated in FIG. 8, 3×3 light receiving cells 18*a* which are arranged in a lattice shape (square lattice shape) are allocated to each microlens 16*a* of the microlens array 16. Hereinafter, a light receiving cell group (3×3 light receiving cells 18*a*) corresponding to one microlens 16*a* is referred to as a unit block.

The central pupil image 17*a* is formed on only the central light receiving cell 18*a* of the unit block and the annular pupil image 17*b* is formed on eight peripheral light receiving cells 18*a* of the unit block.

According to the imaging device 10 having the above-mentioned structure, it is possible to capture a wide-angle image corresponding to the central optical system 13 and a telephoto image corresponding to the annular optical system 14 at the same time, which will be described below.

A color filter array which is formed by color filters provided on each light receiving cell is provided on an imaging surface of the imaging element 18, which is not illustrated in the drawings. The color filter array includes three primary color filters (hereinafter, referred to as an R filter, a G filter, and a B filter) which transmit light in red (R), green (G), and blue (B) wavelength ranges. Any one of the R, G, and B filters is provided on each light receiving cell 18*a*. Hereinafter, a light receiving cell 18*a* on which the R filter is provided is referred to as an "R light receiving cell", a light receiving cell 18*a* on which the G filter is provided is referred to as a "G light receiving cell", and a light receiving cell 18*a* on which the B filter is provided is referred to as a "B light receiving cell".

For example, a group of the central light receiving cells 18*a* (the light receiving cells 18*a* on which a light beam transmitted through the central optical system 13 is incident) in each unit block is generated by arranging the R light receiving cells, the G light receiving cells, and the B light receiving cells in a Bayer array. Therefore, the image of the group of the central light receiving cells 18*a* is a mosaic image of the Bayer array. As a result, a demosaicing process (synchronization process) can be performed for the mosaic image of the Bayer array to obtain a color image.

In a group of eight light receiving cells 18*a* (light receiving cells on which a light beam transmitted through the annular optical system 14 is incident) around the central light receiving cell 18*a* in each unit block, the eight light receiving cells 18*a* includes all of the R, G, and B light receiving cells (the R light receiving cell, the G light receiving cell, and the B light receiving cell). Therefore, it is possible to generate one pixel (R, G, and B pixel values) forming an image obtained by performing a demosaicing process for each unit block, using output signals from the R, G, and B light receiving cells in each unit block.

[Electrical Structure of Imaging Device]

Returning to FIG. 2, the imaging device 10 comprises the imaging optical system 12 including the central optical system 13 and the annular optical system 14 and the directional sensor 17 including the microlens array 16 and the imaging element 18. The overall operation of the imaging device is controlled by a central processing unit (CPU) 40.

The imaging device 10 is provided with an operating unit 38 including the recording switch 38-1, the power switch 38-2 (see FIG. 1), a mode dial (also referred to as a mode switching device), a playback button, a MENU/OK key, a cross key, a BACK key, and a zoom button. A signal transmitted from the operating unit 38 is input to the CPU 40 and the CPU 40 appropriately executes a program read from an electrically erasable programmable read-only memory (EEPROM) 56 on the basis of the input signal to control each circuit of the imaging device 10. For example, the CPU 40 controls an imaging operation, image processing, the recording/playback of image data, and the display of a liquid crystal monitor (liquid crystal display (LCD)) 30.

The recording switch 38-1 (see FIG. 1) is an operation button for inputting an imaging start instruction. The power switch 38-2 (see FIG. 1) is a switch for turning on and off the imaging device 10.

The mode dial is selection means for switching imaging modes when the imaging device 10 captures a moving image. The imaging modes include a first imaging mode in which a wide-angle image formed through the central optical system 13 is acquired, a second imaging mode in which a telephoto image formed through the annular optical system 14 is acquired, and a hybrid imaging mode in which a wide-angle image and a telephoto image are acquired at the same time.

The playback button is a button for switching the mode to a playback mode in which a moving image that has been captured and recorded is displayed on the liquid crystal monitor 30. The MENU/OK key is an operation button that functions as a menu button for issuing a command to display a menu on a screen of the liquid crystal monitor 30 and an OK button for issuing a command to confirm and execute selected content. The cross key is an operating unit that inputs instructions in four directions, that is, the upper, lower, left and right directions and functions as a button (cursor movement operation means) for selecting an item from a menu screen or instructing the selection of various setting items from each menu. In the cross key, up/down key functions as a zoom switch during imaging or a playback zoom switch in the playback mode and a left/right key functions as a frame-by-frame playback (forward direction/reverse direction) button in the playback mode. For example, the BACK key is used to erase a desired target, such as a selected item, to cancel instructed content, or to return to a previous operating state.

The zoom button is a button that is operated during a zooming operation. The focus adjustment unit 39 moves, for example, the lens 14*a* of the annular optical system 14 in the direction of the imaging optical axis L2 in response to an operation input to the zoom button. In this way, it is possible to adjust the focus of the annular optical system 14.

In the imaging mode, object light is focused on the light receiving surface of the imaging element 18 through the imaging optical system 12 and the microlens array 16.

Each light receiving cell 18*a* (light receiving element) of the imaging element 18 converts the object image formed on the light receiving surface into a signal voltage (or charge) corresponding to the amount of incident light.

The signal voltage (or charge) accumulated in the imaging element 18 is stored in the light receiving cell 18*a* or a capacitor that is provided in the light receiving cell 18*a*. The sensor control unit 32 selects the position of a pixel and reads the stored signal voltage (or charge) from the pixel, using a MOS sensor (so-called CMOS sensor) method using an X-Y array system.

In this way, it is possible to read, from the imaging element 18, an image signal indicating a wide-angle image formed by a pixel group corresponding to the central optical system 13 and an image signal indicating a telephoto image formed by a pixel group corresponding to the annular optical system 14.

For the pixel signal (voltage signal) read from the imaging element 18, the pixel signal from each pixel is sampled and held by a correlated double sampling process (a process of calculating the difference between a feed-through component level and a signal component level included in an output signal from each pixel of the sensor and obtaining accurate pixel data, in order to reduce, for example, the amount of noise (in particular, thermal noise) included in the output signal from the sensor). Then, the pixel signal is amplified and transmitted to an A/D converter 20. The A/D converter 20 converts the pixel signals which are sequentially input into digital signals and outputs the digital signals to an image input controller 22 (corresponding to an image acquisition unit according to the invention). In some cases, the A/D converter is provided in a MOS sensor. In this case, the digital signal is directly output from the imaging element 18.

Since the position of a pixel in the imaging element 18 is selected and a pixel signal is read from the pixel, it is possible to selectively read an image signal indicating a wide-angle image and an image signal indicating a telephoto image.

That is, a pixel signal of the light receiving cell 18a on which the central pupil image 17a is incident in the imaging element 18 is selectively read to acquire an image signal indicating a wide-angle image. A pixel signal of the light receiving cell 18a on which the annular pupil image 17b is incident in the imaging element 18 is selectively read and the pixel signals of eight light receiving cells 18a on which the same annular pupil image 17b is incident are added to generate a pixel signal for one pixel of a telephoto image. This process is performed for each annular pupil image 17b to acquire an image signal indicating the telephoto image. In this way, the image input controller 22 can acquire the image signal indicating the wide-angle image and the image signal indicating the telephoto image.

All of the pixel signals may be read from the imaging element 18 and then temporarily stored in a memory (synchronous dynamic random access memory (SDRAM)) 48 and a digital signal processing unit 24 may generate two image signals, that is, a wide-angle image and a telephoto image on the basis of the pixel signals stored in the memory 48, using the same method as described above.

The digital signal processing unit 24 performs predetermined signal processing, such as an offset process and a gamma correction process for the digital image signal input through the image input controller 22. In a case in which red (R), green (G), and blue (B) image signals are acquired as the image signals indicating the wide-angle image and the telephoto image, the digital signal processing unit 24 performs a demosaicing process for the R, G, and B image signals. Here, the demosaicing process is a process that calculates the information of all colors for each pixel from an RGB mosaic image corresponding to the color filter array of a single-chip color imaging element and is also called a synchronization process. For example, in the case of an imaging element including three R, G, and B color filters, the demosaicing process is a process that calculates the information of all of R, G, and B for each pixel from an RGB mosaic image. In addition, the digital signal processing unit 24 performs, for example, RGB/YC conversion for generating a brightness signal Y and color difference signals Cb and Cr from the R, G, and B image signals subjected to the demosaicing process.

The image data processed by the digital signal processing unit 24 is input to a video random access memory (VRAM) 50. The image data read from the VRAM 50 is encoded by a video encoder 28 and is output to the liquid crystal monitor 30 which is provided on the rear surface of the camera. In this way, the object image is displayed on the display screen of the liquid crystal monitor 30.

When a recording start operation is performed through the recording switch 38-1, image data is output from the A/D converter 20 in response to the recording start operation, is input from the image input controller 22 to the memory 48, and is temporarily stored in the memory 48. The digital signal processing unit 24 appropriately reads the image signal which is temporarily stored in the memory 48 and performs predetermined signal processing for the image signal. Then, the image signal is temporarily stored in the memory 48 again.

The image signal stored in the memory 48 is output to a compression/decompression processing unit 26 and a predetermined moving image compression process, such as Motion Joint Photographic Experts Group (JPEG) compression, is performed for the image signal. Then, the image signal is recorded on the memory card 54 through a media controller 52.

When the first imaging mode or the second imaging mode is selected by the mode dial, it is possible to selectively acquire a wide-angle image or a telephoto image. When the hybrid imaging mode is selected by the mode dial, it is possible to acquire a wide-angle image and a telephoto image at the same time. Therefore, it is possible to acquire a wide-angle image and a telephoto image, without performing a mechanical switching operation between the wide-angle optical system and the telephoto optical system or a zoom operation with a zoom lens.

[Effect of Imaging Device According to First Embodiment]

Figure 9:
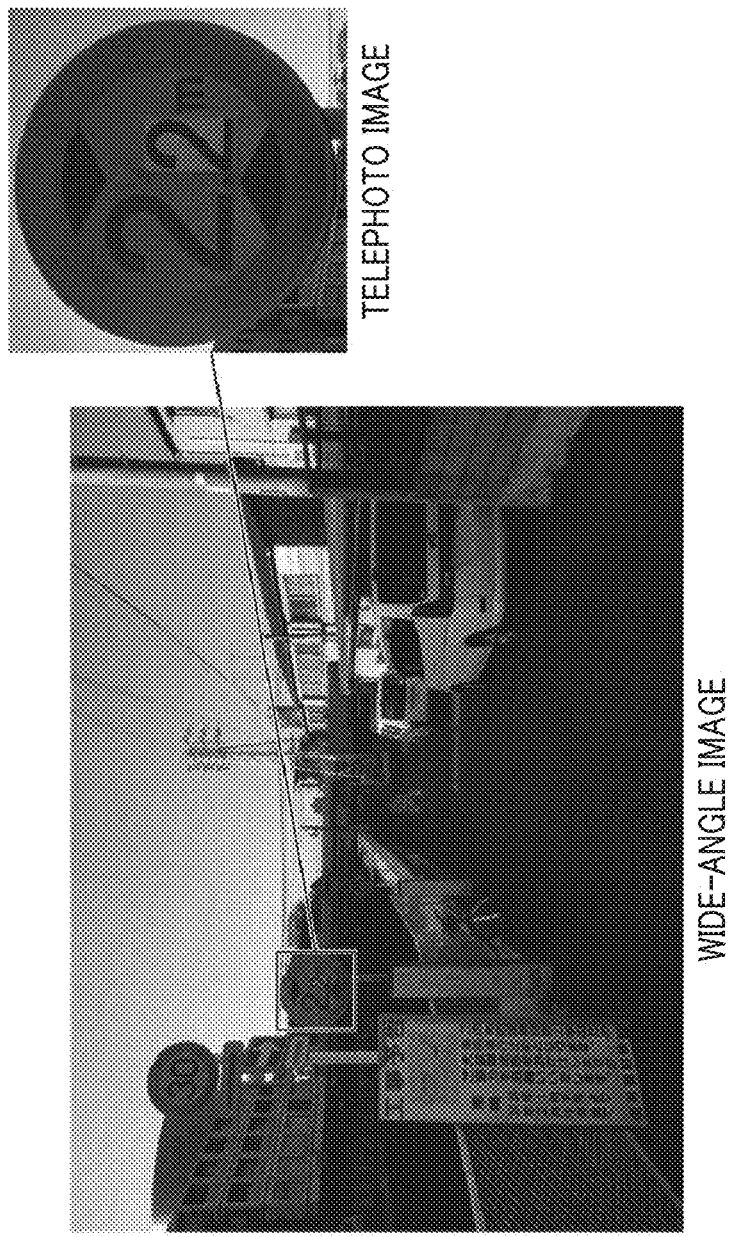
FIG. 9 is a diagram illustrating the effect of the imaging optical system according to the first embodiment.

FIG. 9 is a diagram illustrating the effect of the imaging device 10 according to the first embodiment.

As described above, in the imaging optical system 12 according to the first embodiment, since the difference between the direction of the imaging optical axis L1 of the central optical system 13 and the direction of the imaging optical axis L2 of the annular optical system 14 is the angle θ, it is possible to acquire a wide-angle image and a telephoto image in different imaging regions (different objects), without providing a plurality of imaging elements. In addition, it is possible to display the acquired wide-angle image and telephoto image on the liquid crystal monitor 30 at the same time.

As illustrated in FIG. 9, in the imaging device 10 used as an in-vehicle camera, for example, the direction of the imaging optical axis L2 of the annular optical system 14 is inclined in the upper left direction with respect to the traveling direction of the vehicle to acquire a wide-angle image in front of the vehicle in the traveling direction and a telephoto image of, for example, a road signal or a traffic signal. In addition, in a case in which the direction of the imaging optical axis L2 of the annular optical system 14 is inclined downward with respect to the traveling direction of the vehicle, a telephoto image of a road sign that is painted on the road is acquired, or in a case in which the direction of the imaging optical axis L2 of the annular optical system 14 is inclined to the right with respect to the traveling direction of the vehicle, a telephoto image of an oncoming vehicle on the opposite lane, which not illustrated in the drawings. Therefore, it is possible to display a wide-angle image in front of the vehicle in the traveling direction and a telephoto image of for example, a road signal on the liquid crystal monitor 30 at the same time.

[Another Embodiment of Directional Sensor According to First Embodiment]

Figure 10:
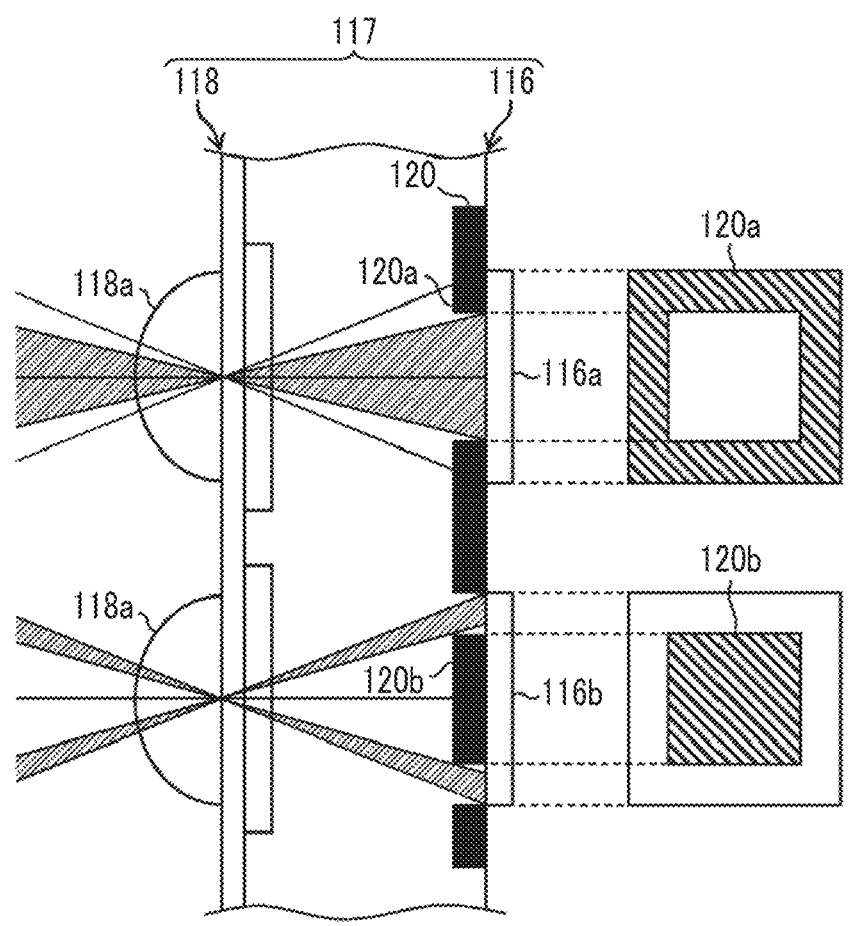
FIG. 10 is a side view illustrating another embodiment of the directional sensor according to the first embodiment.

FIG. 10 is a side view illustrating a directional sensor 117 which is another embodiment of the directional sensor 17 according to the first embodiment.

A directional sensor 117 includes a microlens array 118 as a pupil division unit, a light shielding member 120 functioning as a light shielding mask, and an imaging element 116 including light receiving cells 116a and 116b which are partially shielded by the light shielding member 120. The light receiving cell 116a and the light receiving cell 116b which are partially shielded by the light shielding member 120 are alternately (checkered shape) provided in the horizontal direction and the vertical direction of the imaging element 116.

The microlens array 118 includes microlenses 118a that are in one-to-one correspondence with the light receiving cells 116a and 116b of the imaging element 116.

The light shielding member 120 regulates the openings of the light receiving cells 116a and 116b of the imaging element 116 and has an opening shape corresponding to the central optical system 13 and the annular optical system 14 of the imaging optical system 12. Red (R), green (G), and blue (B) color filters are provided below each lens of the microlens array 118.

A peripheral portion of the opening of the light receiving cell 116a is shielded by a light shielding portion 120a of the light shielding member 120 and a central portion of the opening of the light receiving cell 116b is shielded by a light shielding portion 120b of the light shielding member 120. Therefore, a light beam that has passed through the central optical system 13 of the imaging optical system 12 is pupil-divided by the microlens array 118 and the light shielding portion 120a of the light shielding member 120 and is incident on the light receiving cell 116a. A light beam that has passed through the annular optical system 14 of the imaging optical system 12 is pupil-divided by the microlens array 118 and the light shielding portion 120b of the light shielding member 120 and is incident on the light receiving cell 116b.

Therefore, it is possible to read a pixel signal of a wide-angle image from each light receiving cell 116a of the imaging element 116 and to read a pixel signal of a telephoto image from each light receiving cell 116b of the imaging element 116.

[Imaging Device According to Second Embodiment]

Figure 11:
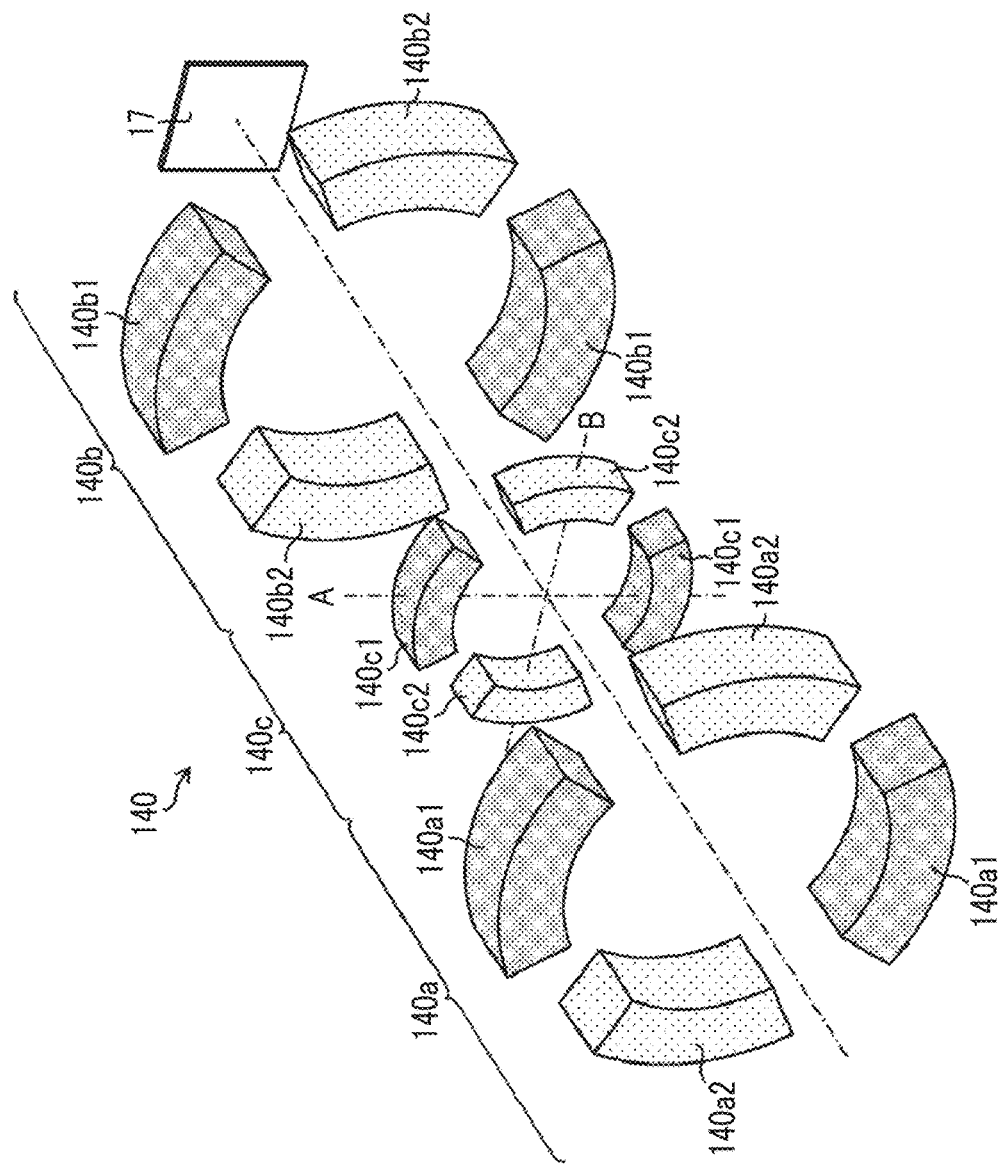
FIG. 11 is a perspective view illustrating an annular optical system forming an imaging optical system of an imaging device according to a second embodiment.
Figure 12:
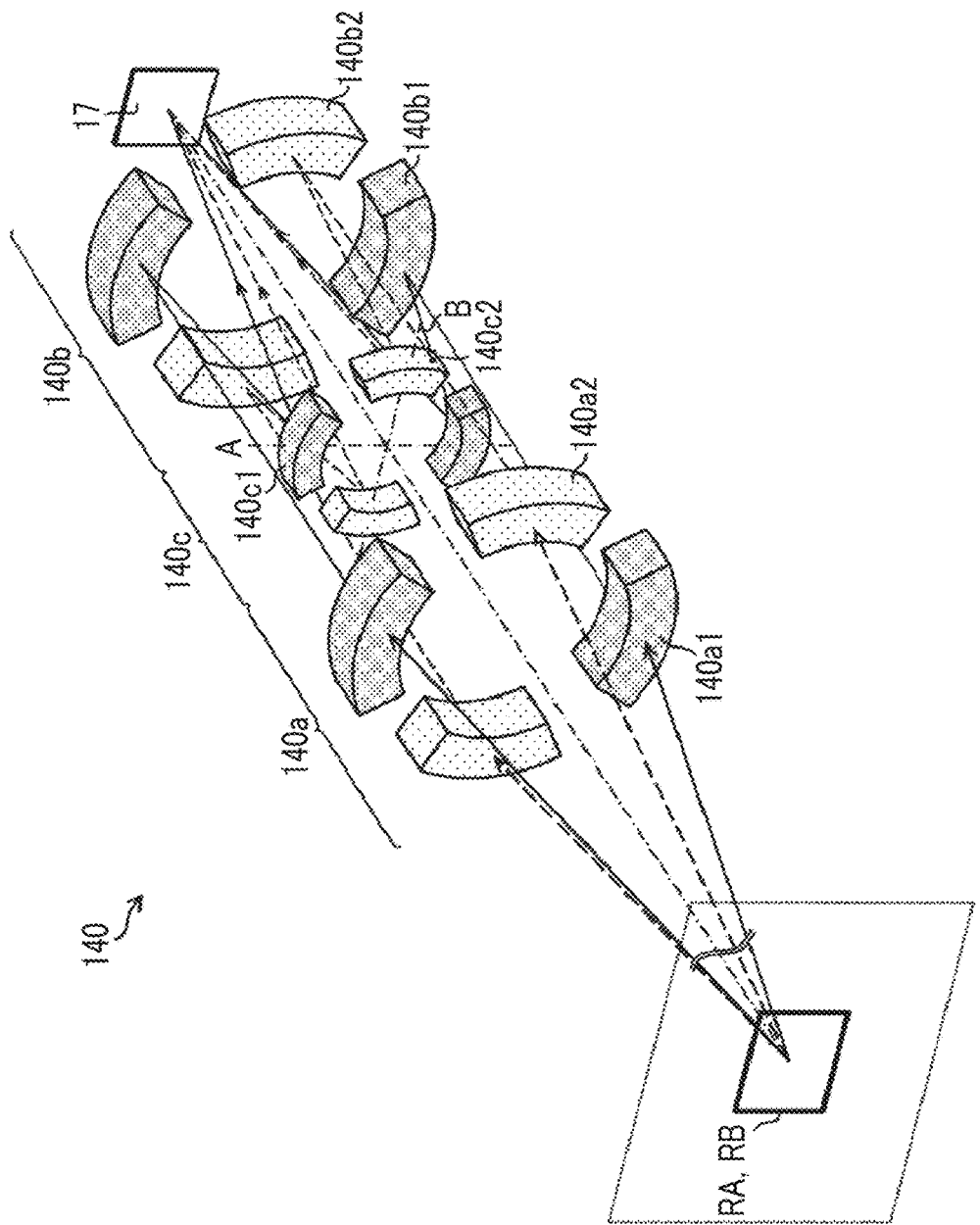
FIG. 12 is a diagram illustrating an imaging region of the annular optical system.

FIG. 11 is a perspective view illustrating an annular optical system 140 forming an imaging optical system of an imaging device according to a second embodiment. FIG. 12 is a diagram illustrating an imaging region of the annular optical system 140. In FIGS. 11 and 12, each portion (a lens, a first reflecting mirror, and a second reflecting mirror) of the annular optical system 140 is illustrated, without being inclined, in order to simplify the description of the overall structure of the annular optical system 140. In addition, reference numerals A and B indicate axes perpendicular to the imaging optical axis L1. The axis A is parallel to the vertical direction and the axis B is parallel to the horizontal direction.

In the first embodiment, an example in which a wide-angle image and one telephoto image are acquired at the same time has been described. However, in the annular optical system 140 according to the second embodiment, telephoto images in a plurality of imaging regions are acquired at the same time. The imaging device according to the second embodiment has the same basic structure as the imaging device according to the first embodiment except that it comprises the annular optical system 140 different from the annular optical system 14 according to the first embodiment. Therefore, components having the same functions and structures as those in the first embodiment are denoted by the same reference numerals and the description thereof will not be repeated.

As illustrated in FIG. 11, the annular optical system 140 is a telephoto optical system, similarly to the annular optical system 14 according to the first embodiment, and forms a telephoto image on the microlens array 16. The annular optical system 140 includes a reflection optical system that reflects a light beam two times and the above-mentioned common lens 15 (see FIG. 3; not illustrated in the second embodiment). The reflection optical system includes a lens 140a, a first reflecting mirror 140b, and a second reflecting mirror 140c. Here, the lens 140a and the first reflecting mirror 140b correspond to a main reflection optical system according to the invention and the second reflecting mirror 140c corresponds to a sub-reflection optical system according to the invention. The axis A and the axis B intersect each other in the vicinity of an intersection point between the imaging optical axis L1 and the second reflecting mirror 140c.

The lens 140a, the first reflecting mirror 140b, and the second reflecting mirror 140c each have a structure that is divided into four parts in a direction that rotates about the imaging optical axis L1.

The lens 140a includes a pair of lens groups 140a1 that face each other, with a plane (hereinafter, referred to as a B plane) including the imaging optical axis L1 and the axis B interposed therebetween, and a pair of lens groups 140a2 that face each other, with a plane (hereinafter, referred to as an A plane) including the imaging optical axis L and the axis A interposed therebetween.

The first reflecting mirror 140b includes a pair of first reflecting mirror groups 140b1 that face each other, with the B plane interposed therebetween, and a pair of first reflecting mirror groups 140b2 that face each other, with the A plane interposed therebetween. The second reflecting mirror 140c includes a pair of second reflecting mirror groups 140c1 that face each other, with the B plane interposed therebetween, and a pair of second reflecting mirror groups 140c2 that face each other, with the A plane interposed therebetween.

As illustrated in FIG. 12, a light beam that is incident through the lens group 140a1 is reflected two times by the first reflecting mirror group 140b1 and the second reflecting mirror group 140c1 and passes through the common lens 15 (see FIG. 3). In contrast, a light beam that is incident through the lens group 140a2 is reflected two times by the first reflecting mirror group 140b2 and the second reflecting mirror group 140c2 and passes through the common lens 15.

The annular optical system 140 includes a plurality of annular optical systems (that is, a plurality of telephoto optical systems) including a first annular optical system that is formed by the lens group 140a1, the first reflecting mirror group 140b1, and the second reflecting mirror group 140c1 and a second annular optical system that is formed by the lens group 140a2, the first reflecting mirror group 140b2, and the second reflecting mirror group 140c2. Therefore, in the annular optical system 140, telephoto images are formed on the microlens array 16 by the first annular optical system and the second annular optical system. In FIG. 12, as described above, since the inclination angle θ (see FIG. 4) of the first annular optical system and the second annular optical system with respect to a light receiving surface of the directional sensor 17 is 0°, the imaging regions RA and RB of the telephoto images obtained by the first annular optical system and the second annular optical system are the same.

Figure 13:
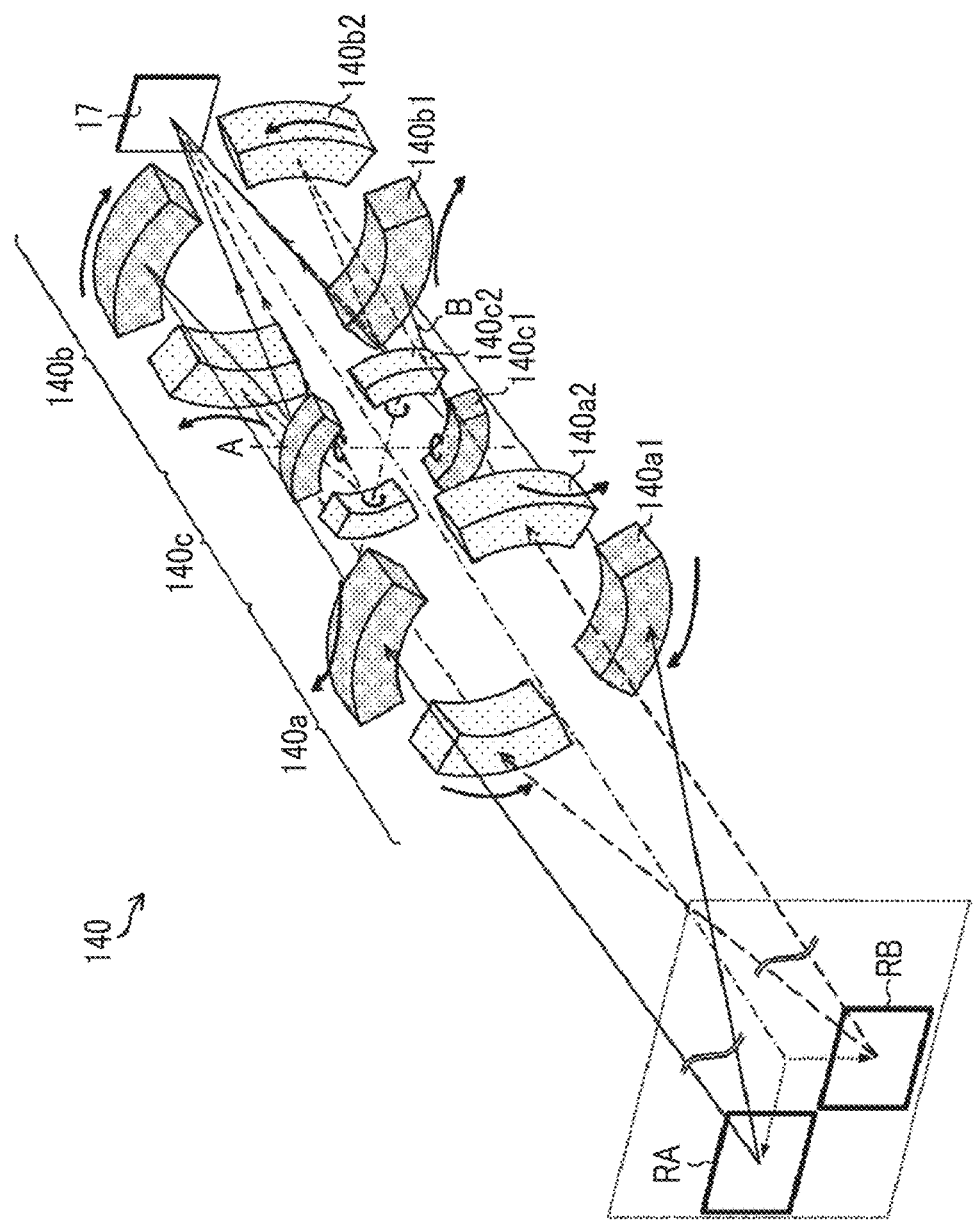
FIG. 13 is a diagram illustrating each imaging region of a first annular optical system and a second annular optical system of the annular optical system.
Figure 14:
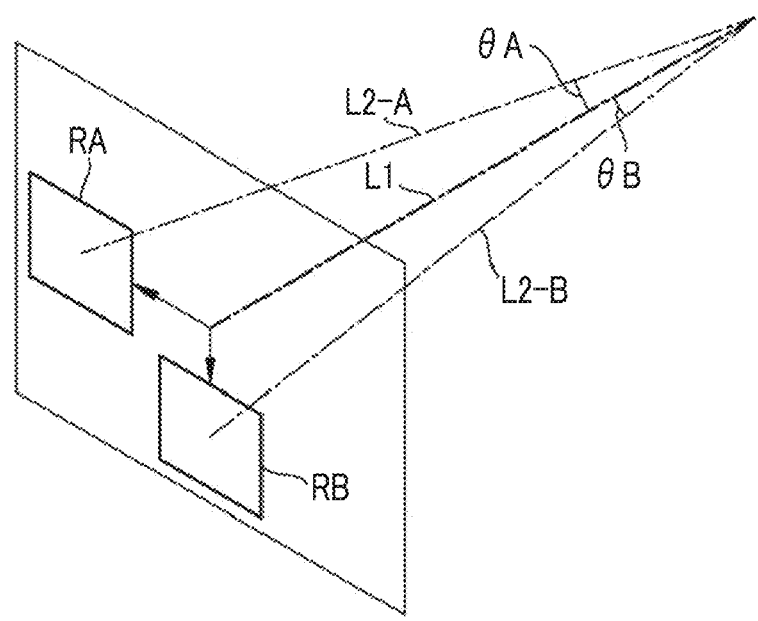
FIG. 14 is a diagram illustrating the directions of the imaging optical axes of a central optical system, the first annular optical system, and the second annular optical system.

FIG. 13 is a diagram illustrating the imaging regions of the first annular optical system and the second annular optical system of the annular optical system 140. FIG. 14 is a diagram illustrating the directions of the imaging optical axes of the central optical system 13 (see FIG. 3), the first annular optical system, and the second annular optical system.

As illustrated in FIGS. 13 and 14, in the first annular optical system, the lens group 140a1 and the first reflecting mirror group 140b1 forming the main reflection optical system are provided so as to be inclined as a group by an angle θA with respect to the light receiving surface of the directional sensor 17 (the direction of the imaging optical axis L1) in the direction of rotation about the axis A. In addition, in the first annular optical system, the second reflecting mirror group 140c1 forming the sub-reflection optical system is provided so as to be inclined by an angle that is half of the angle θA in the direction of rotation about the axis A which is the same direction as that in the main reflection optical system. Therefore, it possible to rotate an imaging optical axis L2-A of the first annular optical system about the axis A so as to be inclined by the angle θA with respect to the imaging optical axis L1, without moving an imaging plane of a telephoto image which is formed on the microlens array 16 by the first annular optical system. That is, the direction of the imaging optical axis L2-A can be different from the direction of the imaging optical axis L1 in the horizontal direction.

In the second annular optical system, the lens group 140a2 and the first reflecting mirror group 140b2 forming the main reflection optical system are provided so as to be inclined as a group by an angle θB with respect to the light receiving surface of the directional sensor 17 (the direction of the imaging optical axis L1) in the direction of rotation about the axis B. In addition, in the second annular optical system, the second reflecting mirror group 140c2 forming the sub-reflection optical system is provided so as to be inclined by the angle θB in the direction of rotation about the axis B which is the same direction as that in the main reflection optical system. Therefore, it is possible to tilt an imaging optical axis L2-B of the second annular optical system by the angle θB with respect to the imaging optical axis L1 in the direction of rotation about the axis B, without moving an imaging plane of a telephoto image which is formed on the microlens array 16 by the second annular optical system. That is, the direction of the imaging optical axis L2-B can be different from the direction of the imaging optical axis L1 in the vertical direction.

As such, since the direction of the imaging optical axis L2-A of the first annular optical system and the direction of the imaging optical axis L2-B of the second annular optical system are different from the direction of the imaging optical axis L1 in different directions, telephoto images in different imaging regions RA and RB are obtained. Since the lens 140a is divided, the interference between the divided parts is prevented. This holds for the first reflecting mirror 140b and the second reflecting mirror 140c.

In this embodiment, the direction of the imaging optical axis L2-A and the direction of the imaging optical axis L2-B are different from the direction of the imaging optical axis L1 in the horizontal direction and the vertical direction. However, the directions are not particularly limited. For example, there may be the differences between the directions in at least one of the horizontal direction and the vertical direction.

[Directional Sensor]

Figure 15:
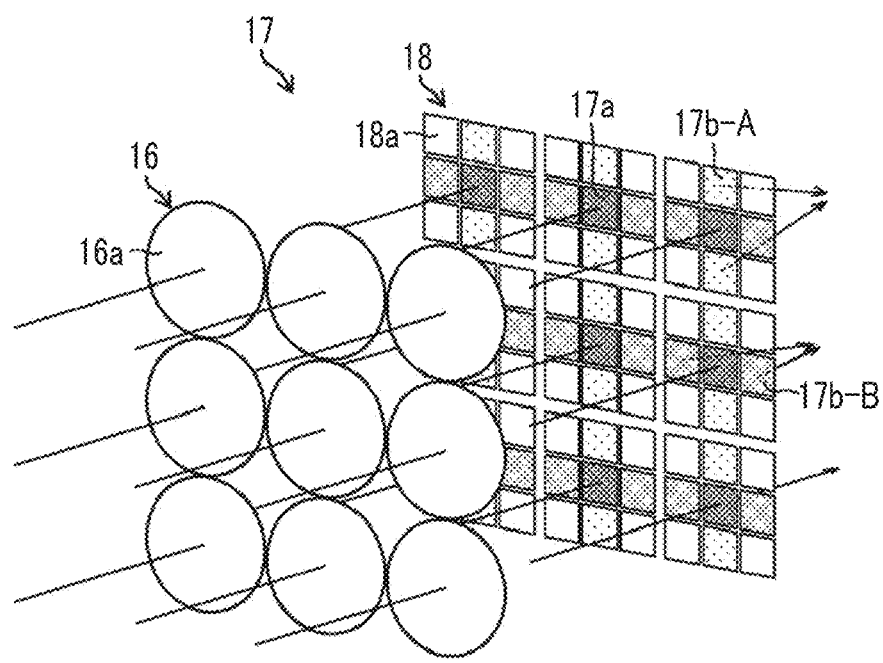
FIG. 15 is an enlarged view illustrating main portions of a microlens array and an imaging element forming a directional sensor according to the second embodiment.

FIG. 15 is an enlarged view illustrating main portions of the microlens array 16 and the imaging element 18 forming the directional sensor 17 according to the second embodiment.

As illustrated in FIG. 15, each microlens 16a of the microlens array 16 that functions as a pupil division unit forms a central pupil image 17a corresponding to the central optical system 13, a partial annular pupil image 17b-A corresponding to the first annular optical system of the annular optical system 140, and a partial annular pupil image 17b-B corresponding to the second annular optical system of the annular optical system 140 on light receiving cells 18a in the corresponding light receiving region of the imaging element 18. In addition, any one of the R, G, and B filters is provided on each light receiving cell 18a.

The central pupil image 17a is formed on only the central light receiving cell 18a of the unit block which is a light receiving cell group corresponding to one microlens 16a. The annular pupil image 17b-A is formed on only two light receiving cells 18a which are adjacent the central light receiving cell 18a of the unit block in the vertical direction. The annular pupil image 17b-B is formed on only two light receiving cells 18a which are adjacent to the central light receiving cell 18a of the unit block in the horizontal direction. Therefore, it is possible to capture a wide-angle image corresponding to the central optical system 13 and two telephoto images corresponding to the first annular optical system and the second annular optical system of the annular optical system 140 at the same time.

In the second embodiment, the position of a pixel in the imaging element 18 is selected and a pixel signal is read from the pixel. Therefore, it is possible to selectively read an image signal indicating a wide-angle image and image signals indicating telephoto images in two different imaging regions RA and RB.

That is, a pixel signal of the light receiving cell on which the central pupil image 17a is incident in the imaging element 18 is selectively read to acquire an image signal indicating a wide-angle image. A pixel signal of the light receiving cell 18a on which the annular pupil image 17b-A is incident in the imaging element 18 is selectively read and the pixel signals of two light receiving cells 18a on which the same annular pupil image 17b-A is incident are added to generate a pixel signal for one pixel of a telephoto image. This process is performed for each annular pupil image 17b-A to acquire an image signal indicating a telephoto image corresponding to the first annular optical system. Similarly, a pixel signal of the light receiving cell 18a on which the annular pupil image 17b-B is incident in the imaging element 18 is selectively read to acquire an image signal indicating a telephoto image corresponding to the second annular optical system. In this way, the image input controller 22 can acquire the image signal indicating the wide-angle image and the image signals indicating the telephoto images in two imaging regions RA and RB.

Then, similarly to the first embodiment, the digital signal processing unit 24 performs predetermined signal processing for the digital image signal input through the image input controller 22 to generate image data of the wide-angle image and image data of the telephoto images in two imaging regions RA and RB. Since the subsequent processes are basically the same as those in the first embodiment, the description thereof will not be repeated.

[Effect of Imaging Device According to Second Embodiment]

Figure 16:
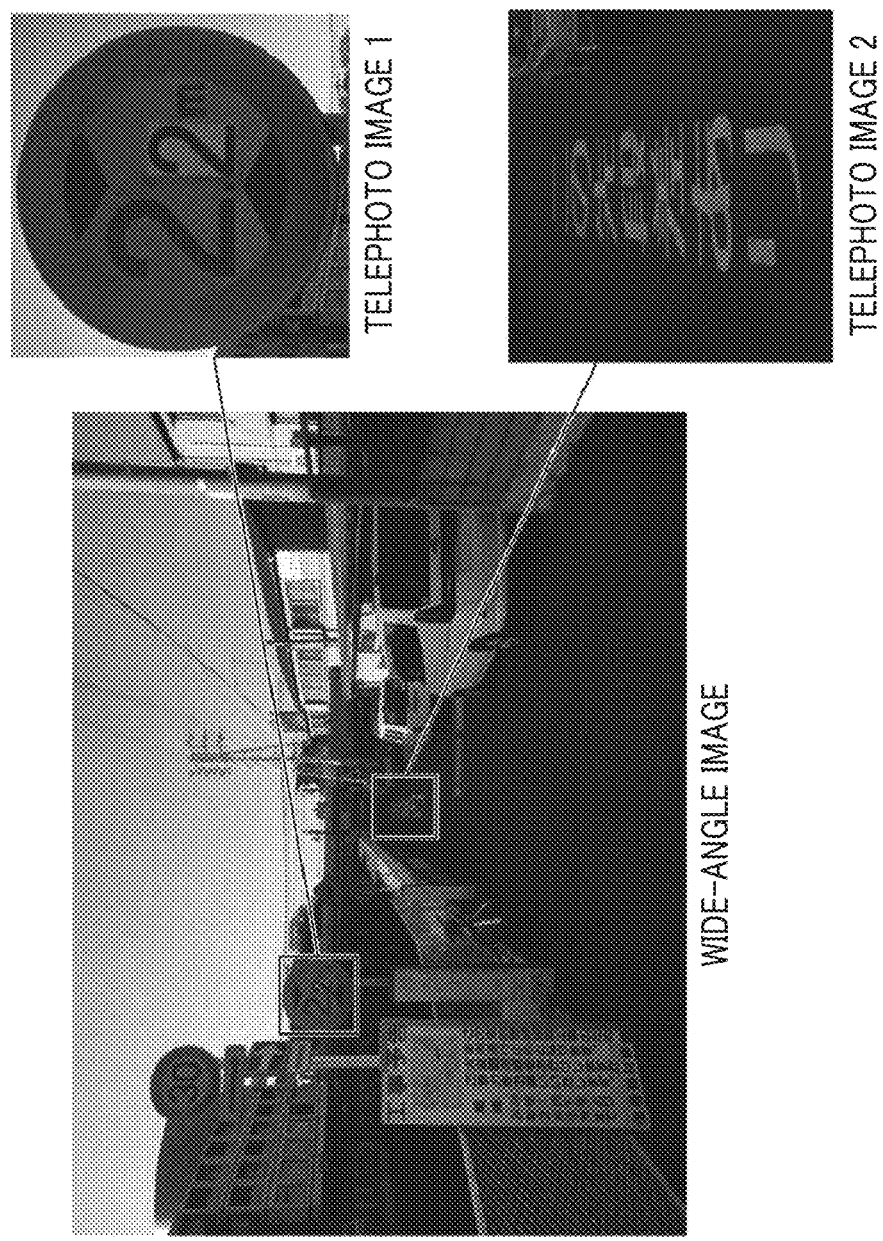
FIG. 16 is a diagram illustrating the effect of the imaging device according to the second embodiment.

FIG. 16 is a diagram illustrating the effect of the imaging device according to the second embodiment.

As described above, in the imaging optical system according to the second embodiment, the direction of the imaging optical axis L1 of the central optical system 13, the direction of the imaging optical axis L2-A of the first annular optical system of the annular optical system 140, and the direction of the imaging optical axis L2-B of the second annular optical system of the annular optical system 140 are different from each other. Therefore, it is possible to acquire a wide-angle image and telephoto images in different imaging regions RA and RB at the same time. It is possible to display the acquired wide-angle image and the acquired telephoto images in the imaging regions RA and RB on the liquid crystal monitor 30 at the same time.

For example, as illustrated in FIG. 16, in the imaging device 10 used as an in-vehicle camera, for example, the direction of the imaging optical axis L2-A of the first annular optical system is inclined in the upper left direction with respect to the traveling direction of the vehicle and the direction of the imaging optical axis L2-B of the second annular optical system inclined downward with respect to the traveling direction of the vehicle. Therefore, it is possible to acquire a wide-angle image in front of the vehicle in the traveling direction, a telephoto image (telephoto image 1 in FIG. 16) of, for example, a road signal or a traffic signal, and a telephoto image (telephoto image 2 in FIG. 16) of a road sign that is painted on the road at the same time. That is, it is possible to capture large images of a plurality of objects of interest.

In the second embodiment, since the annular optical system 140 has two imaging optical axes L2-A and L2-B, telephoto images in two different imaging regions are acquired at the same time. However, the annular optical system may be configured so as to have three or more imaging optical axes. In this case, it is possible to acquire telephoto images in three or more different imaging regions at the same time.

<Another Embodiment of Directional Sensor According to Second Embodiment>

Figure 17:
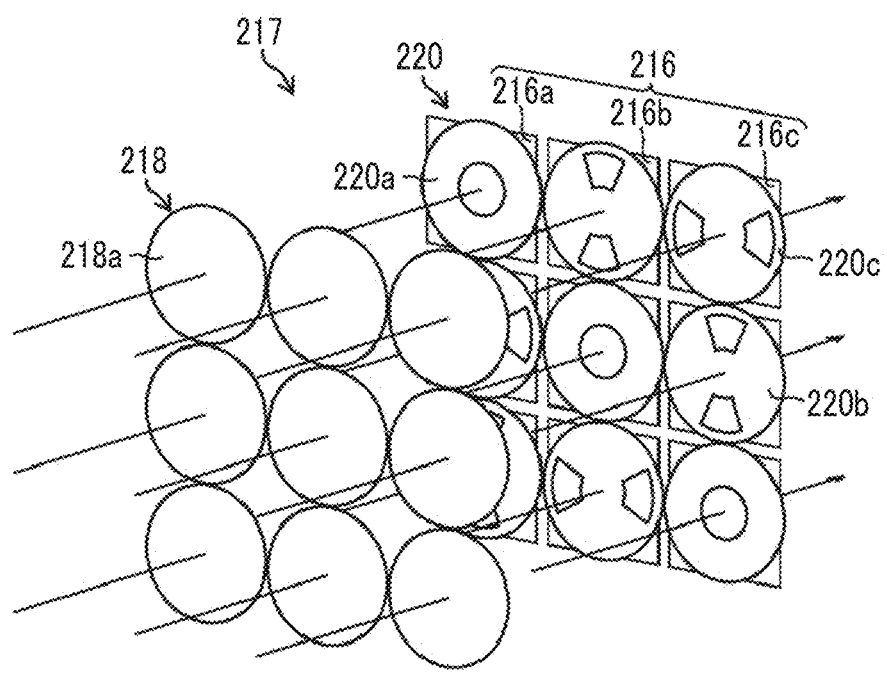
FIG. 17 is an enlarged view illustrating main portions of a microlens array and an imaging element forming a modification example of the directional sensor according to the second embodiment.

FIG. 17 is an enlarged view illustrating main portions of a microlens array and an imaging element forming a directional sensor 217 which is another embodiment of the directional sensor 17 according to the second embodiment.

The directional sensor 217 includes a microlens array 218 as a pupil division unit, a light shielding member 220 functioning as a light shielding mask, and an imaging element 216 including light receiving cells 216a, 216b, and 216c which are partially shielded by the light shielding member 220.

The microlens array 218 includes microlenses 218a that are in one-to-one correspondence with the light receiving cells 216a, 216b, and 216c of the imaging element 216.

The light shielding member 220 regulates the incidence of a light beam on the light receiving cells 216a, 216b, and 216c of the imaging element 216 and has an opening shape corresponding to the central optical system 13 and the first and second annular optical systems of the annular optical system 140.

In the light receiving cell 216a, a region on which a light beam transmitted through the annular optical system 140 is incident is shielded by a light shielding portion 220a of the light shielding member 220. In the light receiving cell 216b, a region on which light beams transmitted through the central optical system 13 and the second annular optical system of the annular optical system 140 are incident is shielded by a light shielding portion 220b of the light shielding member 220. In the light receiving cell 216c, a region on which light beams transmitted through the central optical system 13 and the first annular optical system of the annular optical system 140 are incident is shielded by a light shielding portion 220c of the light shielding member 220.

The light beam transmitted through the central optical system 13 is pupil-divided by the microlens array 218 and the light shielding portion 220a of the light shielding member 220 and then incident on the light receiving cell 216a. The light beam transmitted through the first annular optical system is pupil-divided by the microlens array 218 and the light shielding portion 220b of the light shielding member 220 and is then incident on the light receiving cell 216b. The light beam transmitted through the second annular optical system is pupil-divided by the microlens array 218 and the light shielding portion 220c of the light shielding member 220 and is then incident on the light receiving cell 216c.

Therefore, it is possible to read a pixel signal of a wide-angle image from each light receiving cell 216a of the imaging element 216. In addition, it is possible to read a pixel signal of a telephoto image corresponding to the first annular optical system from each light receiving cell 216b of the imaging element 216. It is possible to read a pixel signal of a telephoto image corresponding to the second annular optical system from each light receiving cell 216c of the imaging element 216.

[Imaging Device According to Third Embodiment]

Figure 18:
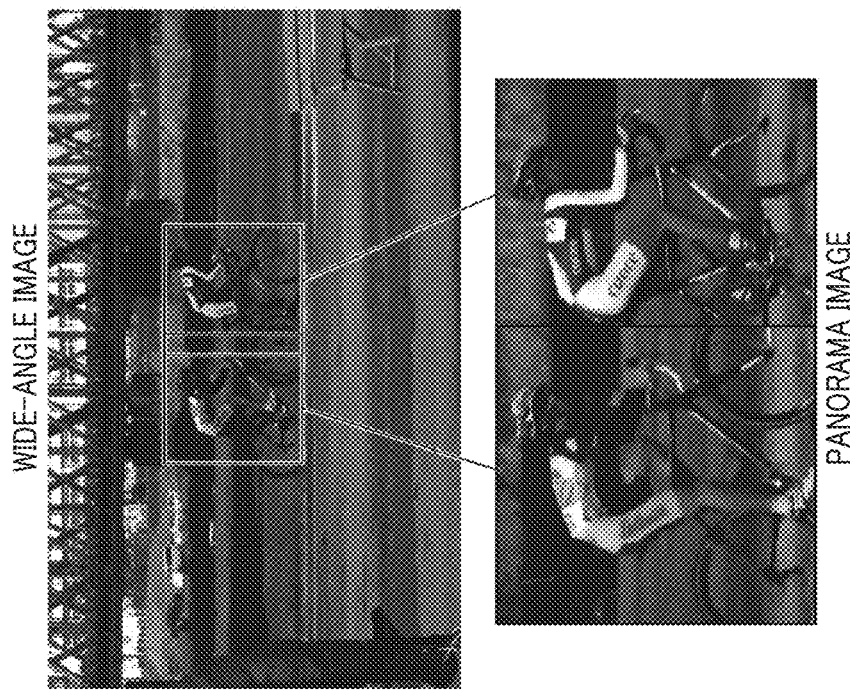
FIG. 18 is a diagram illustrating an imaging device according to a third embodiment which generates a panorama image of telephoto images in different imaging regions.

FIG. 18 is a diagram illustrating an imaging device according to a third embodiment which generates a panorama image of telephoto images in different imaging regions RA and RB.

The imaging device according to the third embodiment has the same basic structure as the imaging device according to the second embodiment except that the directions of the imaging optical axes L2-A and L2-B of the first annular optical system and the second annular optical system of the annular optical system 140 according to the second embodiment and the focal lengths of the first annular optical system and the second annular optical system are changed. Therefore, components having the same functions and structures as those in the second embodiment are denoted by the same reference numerals and the description thereof will not be repeated.

As illustrated in FIG. 18, the first annular optical system and the second annular optical system of the annular optical system 140 have the same focal length and the angle (angles θA and θB) of each portion of the first annular optical system and the second annular optical system is adjusted such that the imaging regions RA and RB (that is, the angles of view) partially overlap each other. Therefore, an object of an object that is long in one direction (the horizontal direction in FIG. 18) can be captured in two imaging regions RA and RB in the direction. As a result, the image input controller 22 can acquire an image signal indicating a wide-angle image and an image signal indicating telephoto images in the imaging regions RA and RB which are adjacent to each other and partially overlap.

The digital signal processing unit 24 (see FIG. 2; corresponding to an image processing unit according to the invention) performs predetermined signal processing for the digital image signal input through the image input controller 22 to generate image data of the wide-angle image, similarly to the second embodiment. In addition, the digital signal processing unit 24 generates an image signal indicating a panorama image obtained by combining the telephoto images in the adjacent imaging regions RA and RB, on the basis of the image signal indicating the telephoto images in the imaging regions RA and RB. Then, the digital signal processing unit 24 performs predetermined signal processing for the image signal indicating the panorama image to generate image data of the panorama image. Therefore, it is possible to display the wide-angle image and the panorama image on the liquid crystal monitor 30 at the same time.

As described above, in the third embodiment according to the invention, the first annular optical system and the second annular optical system of the annular optical system 140 have the same focal length and the imaging regions RA and RB partially overlap each other. According to this structure, it is possible to obtain a panorama image obtained by combining the telephoto images in the adjacent imaging regions RA and RB. Therefore, it is possible to capture an image of an object that is too large to be put in the field of view with only one telephoto image. As a result, it is possible to effectively capture an image of an object that is long in one direction (the horizontal direction in FIG. 18). That is, it is possible to enlarge an imaging region of a telephoto image.

In the third embodiment, a case in which a panorama image of an object that is long in the horizontal direction is generated has been described. However, the angle of each portion of the first annular optical system and the second annular optical system may be adjusted to generate a panorama image of an object that is long in an arbitrary direction perpendicular to the imaging optical axis L1, such as the vertical direction.

In a case in which the annular optical system 140 has three or more annular optical systems, that is, first to N-th annular optical systems, the annular optical systems are configured such that they have the same focal length and adjacent imaging regions (angles of view) partially overlap each other. In this way, a panorama image obtained by combining three or more telephoto images is obtained.

[Another Embodiment of Imaging Device]

Another embodiment of the imaging device 10 may be, for example, a digital camera or a mobile phone, a smart phone, a personal digital assistant (PDA), or a portable game machine with a camera function. Hereinafter, a smart phone will be described in detail as an example of the imaging device with reference to the drawings.

<Structure of Smart Phone>

Figure 19:
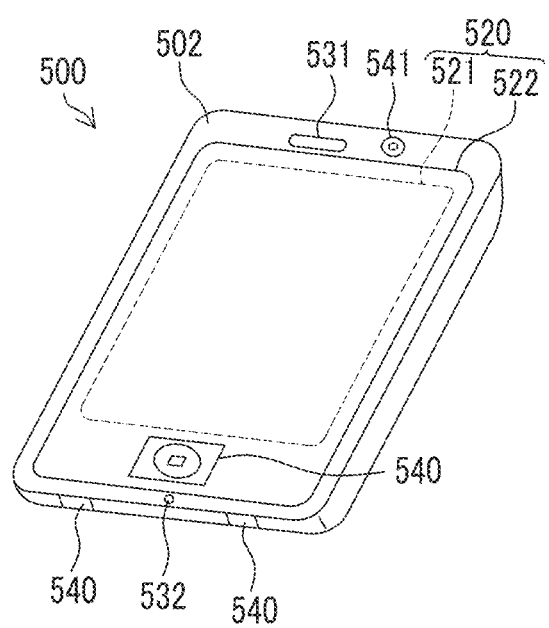
FIG. 19 is a diagram illustrating the outward appearance of a smart phone which is another embodiment of the imaging device.

FIG. 19 is a diagram illustrating the outward appearance of a smart phone 500 which is another embodiment of the imaging device 10. The smart phone 500 illustrated in FIG. 19 includes a housing 502 with a flat panel shape and a display input unit 520 having a display panel 521 as a display unit and an operation panel 522 as an input unit which are integrally formed on one surface of the housing 502. The housing 502 includes a speaker 531, a microphone 532, an operating unit 540, and a camera unit 541. However, the configuration of the housing 502 is not limited thereto. For example, the display unit and the input unit may be independently provided, or the housing 502 may have a folding structure or a sliding structure.

Figure 20:
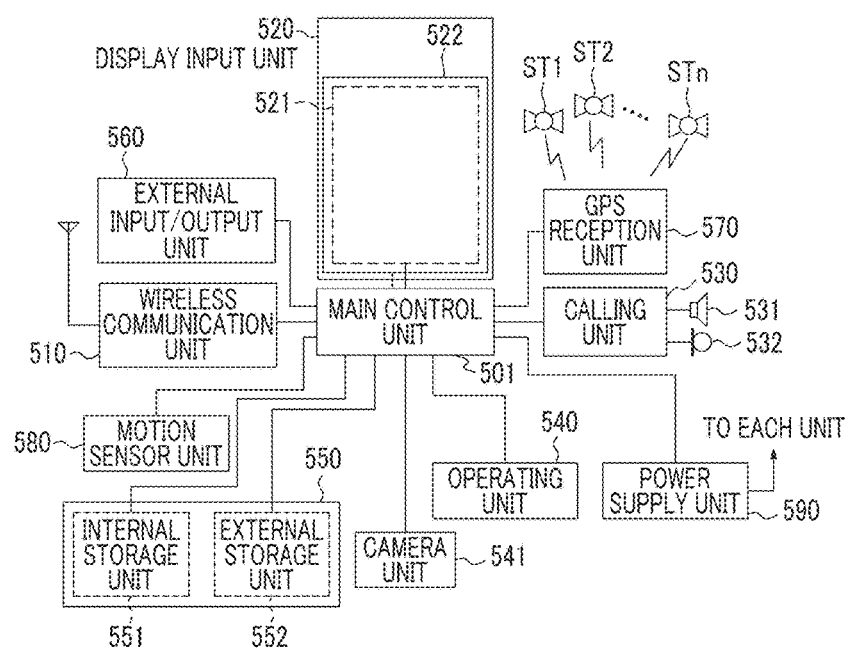
FIG. 20 is a block diagram illustrating the structure of the smart phone illustrated in FIG. 19.

FIG. 20 is a block diagram illustrating the structure of the smart phone 500 illustrated in FIG. 19. As illustrated in FIG. 20, the smart phone 500 comprises, as main components, a wireless communication unit 510, the display input unit 520, a calling unit 530, the operating unit 540, the camera unit 541, a storage unit 550, an external input/output unit 560, a global positioning system (GPS) receiving unit 570, a motion sensor unit 580, a power supply unit 590, and a main control unit 501. In addition, the smart phone 500 has, as a main function, a wireless communication function which performs mobile wireless communication through a base station apparatus and a mobile communication network.

The wireless communication unit 510 performs wireless communication with the base station apparatus which is accommodated in the mobile communication network in response to an instruction from the main control unit 501. The wireless communication is used to transmit and receive various types of file data, such as voice data and image data, and electronic mail data or to receive, for example, web data or streaming data.

The display input unit 520 is a so-called touch panel that displays, for example, images (still images and moving images) or text information to visually transmit information to the user and detects the user's operation for the displayed information under the control of the main control unit 501 and comprises the display panel 521 and the operation panel 522. It is preferable that the display panel 521 is a 3D display panel in a case in which a generated 3D image is viewed.

The display panel 521 uses, for example, a liquid crystal display (LCD) or an organic electro-luminescence display (OELD) as a display device.

The operation panel 522 is a device that is provided such that an image displayed on a display surface of the display panel 521 is visually recognized and detects one or a plurality of coordinate points operated by a finger of the user or a stylus (for example, one coordinate point is detected in a case in which a tap operation of pressing one point on the display surface performed and a plurality of coordinate points are detected in a case in which a gesture operation of drawing a trace on the display surface using a finger or a stylus). When the device is operated by a finger of the user or a stylus, a detection signal which is generated by the operation is output to the main control unit 501. Then, the main control unit 501 detects an operation position (coordinates) on the display panel 521 on the basis of the received detection signal.

As illustrated in FIG. 19, the display panel 521 and the operation panel 522 of the smart phone 500 are integrated to form the display input unit 520 and the operation panel 522 is provided so as to completely cover the display panel 521. In a case in which this structure is used, the operation panel 522 may have a function of detecting the user's operation even in a region other than the display panel 521. In other words, the operation panel 522 may comprise a detection region (hereinafter, referred to as a display region) for an overlap portion which overlaps the display panel 521 and a detection region (hereinafter, referred to as a non-display region) for an outer edge portion which does not overlap the display panel 521.

The size of the display region may be exactly equal to the size of the display panel 521. However, the sizes are not necessarily equal to each other. The operation panel 522 may comprise two sensitive regions, that is, an outer edge portion and an inner portion other than the outer edge portion. The width of the outer edge portion is appropriately designed according to, for example, the size of the housing 502. Examples of a position detecting method which is used in the operation panel 522 include a matrix switching method, a resistive film method, a surface elastic wave method, an infrared method, an electromagnetic induction method, and a capacitive sensing method. Any of the methods may be used.

The calling unit 530 comprises the speaker 531 and the microphone 532. The calling unit 530 converts the voice of the user which is input through the microphone 532 into voice data which can be processed by the main control unit 501 and outputs the converted voice data the main control unit 501. In addition, the calling unit 530 decodes voice data received by the wireless communication unit 510 or the external input/output unit 560 and outputs the decoded voice data from the speaker 531. As illustrated in FIG. 19, for example, the speaker 531 can be mounted on the same surface as the display input unit 520 and the microphone 532 can be mounted on the side surface of the housing 502.

The operating unit 540 is a hardware key which uses, for example, a key switch and receives instructions from the user. For example, the operating unit 540 is a push button switch which is mounted on a lower portion and a lower surface of the display unit of the housing 502 of the smart phone 500, is turned on when it is pressed by, for example, a finger, and is turned off by the restoring force of a spring when the finger is taken off.

The storage unit 550 stores a control program or control data of the main control unit 501, address data which is associated with, for example, the names or phone numbers of communication partners, and transmitted and received electronic mail data, web data which is downloaded by web browsing, or downloaded content data. In addition, the storage unit 550 temporarily stores, for example, streaming data. The storage unit 550 includes an internal storage unit 551 which is provided in the smart phone and an external storage unit 552 which has a detachable external memory slot. The internal storage unit 551 and the external storage unit 552 forming the storage unit 550 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 560 functions as an interface with all of the external apparatuses connected to the smart phone 500 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB) (registered trademark) network or a ZigBee (registered trademark) network).

Examples of the external apparatus connected to the smart phone 500 include a wired/wireless headset, a wired/wireless external charger, a wired/wireless data port, a memory card which is connected through a card socket, a subscriber identity module (SIM)/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit can transmit data which is received from the external apparatus to each component of the smart phone 500 or can transmit data in the smart phone 500 to the external apparatus.

The GPS receiving unit 570 receives GPS signals transmitted from GPS satellites ST1 to STn and performs a position measurement process on the basis of a plurality of received GPS signals to detect a position including the latitude, longitude, and height of the smart phone 500, in response to an instruction from the main control unit 501. When the GPS receiving unit 570 can acquire positional information from the wireless communication unit 510 or the external input/output unit 560 (for example, a wireless LAN), it can detect the position using the positional information.

The motion sensor unit 580 comprises, for example, a triaxial acceleration sensor and detects the physical movement of the smart phone 500 in response to an instruction from the main control unit 501. When the physical movement of the smart phone 500 is detected, the moving direction or acceleration of the smart phone 500 is detected. The detection result is output to the main control unit 501.

The power supply unit 590 supplies power which is stored in a battery (not illustrated) to each unit of the smart phone 500 in response to an instruction from the main control unit 501.

The main control unit 501 comprises a microprocessor, operates on the basis of the control program or control data stored in the storage unit 550, and controls the overall operation of each unit of the smart phone 500. The main control unit 501 has an application processing function and a mobile communication control function of controlling each unit of a communication system in order to perform voice communication or data communication through the wireless communication unit 510.

The application processing function is implemented by the operation of the main control unit 501 based on the application software which is stored in the storage unit 550. Examples of the application processing function include an infrared communication function which controls the external input/output unit 560 such that data communication with an opposing apparatus is performed, an electronic mail function which transmits and receives electronic mail, and a web browsing function which browses web pages.

The main control unit 501 has, for example, an image processing function which displays an image on the display input unit 520 on the basis of image data (still image or moving image data) such as received data or downloaded streaming data. The image processing function means the function of the main control unit 501 decoding the image data, performing image processing on the decoding result, and displaying the image on the display input unit 520.

The main control unit 501 performs display control for the display panel 521 and operation detection control for detecting the operation of the user through the operating unit 540 and the operation panel 522.

The main control unit 501 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 521.

The main control unit 501 performs the operation detection control to detect the operation of the user input through the operating unit 540, to receive an operation for the icon or the input of a character string to an input field of the window through the operation panel 522, or to receive a request to scroll the displayed image through the scroll bar.

In addition, the main control unit 501 has a touch panel control function that performs the operation detection control to determine whether the position of an operation for the operation panel 522 is an overlap portion (display region) which overlaps the display panel 521 or an outer edge portion (non-display region) which does not overlap the display panel 521 other than the overlap portion and controls a sensitive region of the operation panel 522 or the display position of the software key.

The main control unit 501 can detect a gesture operation for the operation panel 522 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 541 is a digital camera which captures an image using an imaging element, such as a complementary metal oxide semiconductor (CMOS) a charge-coupled device (CCD). The above-mentioned imaging device 10 can be applied to the camera unit 541. The imaging device 10 can capture a wide-angle image and a telephoto image and is preferable as a camera unit that is incorporated into a thin portable terminal such as the smart phone 500.

The camera unit 541 can convert captured image data into image data which is compressed in various compression formats and record the converted image data in the storage unit 550 or output the converted image data through the external input/output unit 560 or the wireless communication unit 510, under the control of the main control unit 501. As illustrated in FIG. 19, the camera unit 541 is mounted on the same surface as the display input unit 520 in the smart phone 500. However, the mounting position of the camera unit 541 is not limited thereto. For example, the camera unit 541 may be mounted on the rear surface of the display input unit 520 or a plurality of camera units 541 may be mounted. In a case in which a plurality of camera units 541 are mounted, the camera units 541 which are used to capture images may be switched such that a single camera unit captures images or the plurality of camera units 541 may be simultaneously used to capture images.

The camera unit 541 can be used for various functions of the smart phone 500. For example, the image captured by the camera unit 541 can be displayed on the display panel 521 or the image captured by the camera unit 541 can be used as one of the operation inputs of the operation panel 522. When the GPS receiving unit 570 detects the position, the position may be detected with reference to the image from the camera unit 541. In addition, the optical axis direction of the camera unit 541 in the smart phone 500 may be determined or the current usage environment may be determined, with reference to the image from the camera unit 541, using the triaxial acceleration sensor or without using the triaxial acceleration sensor. Of course, the image from the camera unit 541 may be used in the application software.

[Others]

In each of the above-described embodiments, in the imaging optical system 12, the central optical system of is a wide-angle optical system and the annular optical system is a telephoto optical system. However, the invention can be applied to a case in which the central optical system is a telephoto optical system and the annular optical system is a wide-angle optical system. In each of the above-described embodiments, the imaging device having the imaging optical system including the central optical system and the annular optical system is given as an example. However, the invention can be applied to imaging devices having various optical systems including a wide-angle optical system that is provided in one of two different regions and a telephoto optical system that is provided in the other region.

In the reflecting-mirror-type lens structure of the imaging optical system 12 illustrated in FIG. 3, the reflecting mirror is not limited to a concave mirror or a convex mirror and may be a plane mirror. In addition, the number of reflecting mirrors is not limited to two. For example, two or more reflecting mirrors may be provided to reflect light two or more times.

The invention is not limited to the above-described embodiments and various modifications and changes of the invention can be made without departing from the scope and spirit of the invention.

What is claimed is:

1. An imaging device comprising:
   an imaging optical system including a wide-angle optical system and a telephoto optical system which are provided in different regions;
   a directional sensor that includes a plurality of pixels including photoelectric conversion elements which are two-dimensionally arranged, pupil-divides light beams which are incident through the wide-angle optical system and the telephoto optical system, and selectively receives the light beams; and
   an image acquisition unit that acquires a wide-angle image received from the directional sensor through the wide-angle optical system and a telephoto image received from the directional sensor through the telephoto optical system,
   wherein directions of imaging optical axes of the wide-angle optical system and the telephoto optical system of the imaging optical system are different from each other,
   wherein the telephoto optical system includes a plurality of telephoto optical systems which are provided in different regions,
   the directional sensor pupil-divides light beams which are incident through the plurality of telephoto optical systems and selectively receives the light beams, and
   directions of imaging optical axes of the plurality of telephoto optical systems are different from each other, such that each of the imaging optical axes of the plurality of telephoto optical systems is tilted differently from other imaging optical axes of the plurality of telephoto optical systems.

2. The imaging device according to claim 1,
   wherein the directions of the imaging optical axes of the plurality of telephoto optical systems are different from a direction of an imaging optical axis of the wide-angle optical system in at least one of a horizontal direction or a vertical direction.

3. The imaging device according to claim 1,
   wherein the plurality of telephoto optical systems have the same focal length and have angles of view which partially overlap each other.

4. The imaging device according to claim 2,
   wherein the plurality of telephoto optical systems have the same focal length and have angles of view which partially overlap each other.

5. The imaging device according to claim 3, further comprising:
   an image processing unit that generates an image signal indicating a panorama image obtained by combining a plurality of telephoto images, which have been received through the plurality of telephoto optical systems and acquired by the image acquisition unit, on the basis of an image signal indicating the plurality of telephoto images.

6. The imaging device according to claim 4, further comprising:
an image processing unit that generates an image signal indicating a panorama image obtained by combining a plurality of telephoto images, which have been received through the plurality of telephoto optical systems and acquired by the image acquisition unit, on the basis of an image signal indicating the plurality of telephoto images.

7. The imaging device according to claim 1,
wherein one of the wide-angle optical system and the telephoto optical system of the imaging optical system is a circular central optical system and the other optical system is an annular optical system that is provided concentrically with the central optical system.

8. The imaging device according to claim 2,
wherein one of the wide-angle optical system and the telephoto optical system of the imaging optical system is a circular central optical system and the other optical system is an annular optical system that is provided concentrically with the central optical system.

9. The imaging device according to claim 3,
wherein one of the wide-angle optical system and the telephoto optical system of the imaging optical system is a circular central optical system and the other optical system is an annular optical system that is provided concentrically with the central optical system.

10. The imaging device according to claim 4,
wherein one of the wide-angle optical system and the telephoto optical system of the imaging optical system is a circular central optical system and the other optical system is an annular optical system that is provided concentrically with the central optical system.

11. The imaging device according to claim 5,
wherein one of the wide-angle optical system and the telephoto optical system of the imaging optical system is a circular central optical system and the other optical system is an annular optical system that is provided concentrically with the central optical system.

12. The imaging device according to claim 6,
wherein one of the wide-angle optical system and the telephoto optical system of the imaging optical system is a circular central optical system and the other optical system is an annular optical system that is provided concentrically with the central optical system.

13. The imaging device according to claim 7,
wherein the annular optical system is the telephoto optical system of the imaging optical system and includes a reflection optical system that reflects the light beam two or more times.

14. The imaging device according to claim 8,
wherein the annular optical system is the telephoto optical system of the imaging optical system and includes a reflection optical system that reflects the light beam two or more times.

15. The imaging device according to claim 9,
wherein the annular optical system is the telephoto optical system of the imaging optical system and includes a reflection optical system that reflects the light beam two or more times.

16. The imaging device according to claim 10,
wherein the annular optical system is the telephoto optical system of the imaging optical system and includes a reflection optical system that reflects the light beam two or more times.

17. The imaging device according to claim 11,
wherein the annular optical system is the telephoto optical system of the imaging optical system and includes a reflection optical system that reflects the light beam two or more times.

18. The imaging device according to claim 13,
wherein the reflection optical system of the telephoto optical system includes at least a main reflection optical system that reflects the light beam and a sub-reflection optical system that further reflects the light beam reflected by the main reflection optical system,
the main reflection optical system is provided so as to be inclined by an angle corresponding to a difference between an imaging direction of the main reflection optical system and an imaging direction of the wide-angle optical system with respect to a light receiving surface of the directional sensor, and
the sub-reflection optical system is provided so as to be inclined by an angle that is half of the angle with respect to the light receiving surface of the directional sensor.

19. The imaging device according to claim 1, further comprising:
a focus adjustment unit that adjusts a focus of the telephoto optical system.

20. The imaging device according to claim 1,
wherein the directional sensor includes a microlens array that functions as a pupil division unit or a light shielding mask.

21. An imaging device comprising:
an imaging optical system including a wide-angle optical system and a telephoto optical system which are provided in different regions;
a directional sensor that includes a plurality of pixels including photoelectric conversion elements which are two-dimensionally arranged, pupil-divides light beams which are incident through the wide-angle optical system and the telephoto optical system, and selectively receives the light beams; and
an image acquisition unit that acquires a wide-angle image received from the directional sensor through the wide-angle optical system and a telephoto image received from the directional sensor through the telephoto optical system,
wherein the wide-angle optical system includes a first imaging optical axis that extends along a center of the wide-angle optical system in a first direction, the telephoto optical system includes a second imaging optical axis that extends along a center of the telephoto optical system in a second direction, and the first direction is different from the second direction,
wherein the telephoto optical system includes a plurality of telephoto optical systems which are provided in different regions, each of the plurality of telephoto optical systems having a respective imaging optical axis that extends along a center of a respective each of the plurality of telephoto optical systems,
the directional sensor pupil-divides light beams which are incident through the plurality of telephoto optical systems and selectively receives the light beams, and
directions of the imaging optical axes of the plurality of telephoto optical systems are different from each other, such that each of the imaging optical axes of the plurality of telephoto optical systems is tilted differently from other imaging optical axes of the plurality of telephoto optical systems.

* * * * *